United States Patent
Sato et al.

(10) Patent No.: US 8,218,994 B2
(45) Date of Patent: Jul. 10, 2012

(54) IMAGE FORMING APPARATUS

(75) Inventors: Takahisa Sato, Yamato-Koriyama (JP); Masashi Toyoda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1296 days.

(21) Appl. No.: 11/876,174

(22) Filed: Oct. 22, 2007

(65) Prior Publication Data
US 2008/0094645 A1    Apr. 24, 2008

(30) Foreign Application Priority Data
Oct. 24, 2006    (JP) .................. 2006-288831

(51) Int. Cl.
G03G 15/00    (2006.01)
(52) U.S. Cl. ........................................... 399/80
(58) Field of Classification Search ............ 399/80, 399/79
See application file for complete search history.

(56) References Cited

U.S. PATENT DOCUMENTS

| | | |
|---|---|---|
| 2003/0202191 A1 | 10/2003 | Osawa et al. |
| 2004/0168130 A1 | 8/2004 | Ishizaki |
| 2008/0159769 A1 * | 7/2008 | Sato et al. ............ 399/80 |

FOREIGN PATENT DOCUMENTS

| | | |
|---|---|---|
| JP | 02-176676 | 7/1990 |
| JP | 10-044552 | 2/1998 |
| JP | 10-215376 | 8/1998 |
| JP | 10-307510 | 11/1998 |
| JP | 2000-155506 | 6/2000 |
| JP | 2003-324599 | 11/2003 |
| JP | 2004-195845 | 7/2004 |
| JP | 2004-216905 | 8/2004 |
| JP | 2004-260273 | 9/2004 |
| JP | 2006-224514 | 8/2006 |
| JP | 2008-107520 | 5/2008 |

* cited by examiner

*Primary Examiner* — David Gray
*Assistant Examiner* — Rodney Bonnette
(74) *Attorney, Agent, or Firm* — Renner, Otto, Boisselle & Sklar, LLP

(57) ABSTRACT

The image forming apparatus includes an image forming portion that synthetically prints image data and ID image data specific to a user on a recording paper, a paper discharge tray that discharges and accumulates the recording papers, and an ID image reading portion that reads the ID images of the recording papers accumulated in the paper discharge tray, and notifies an external device specified by a user corresponding to the read ID image that the recording papers in the paper discharge tray must be removed. The image forming apparatus includes an output condition setting portion that sets output conditions of the recording papers, and the image forming portion prints the image data on a recording paper and the ID image data on an edge of the recording paper in accordance with the output conditions set by the output condition setting portion.

13 Claims, 22 Drawing Sheets

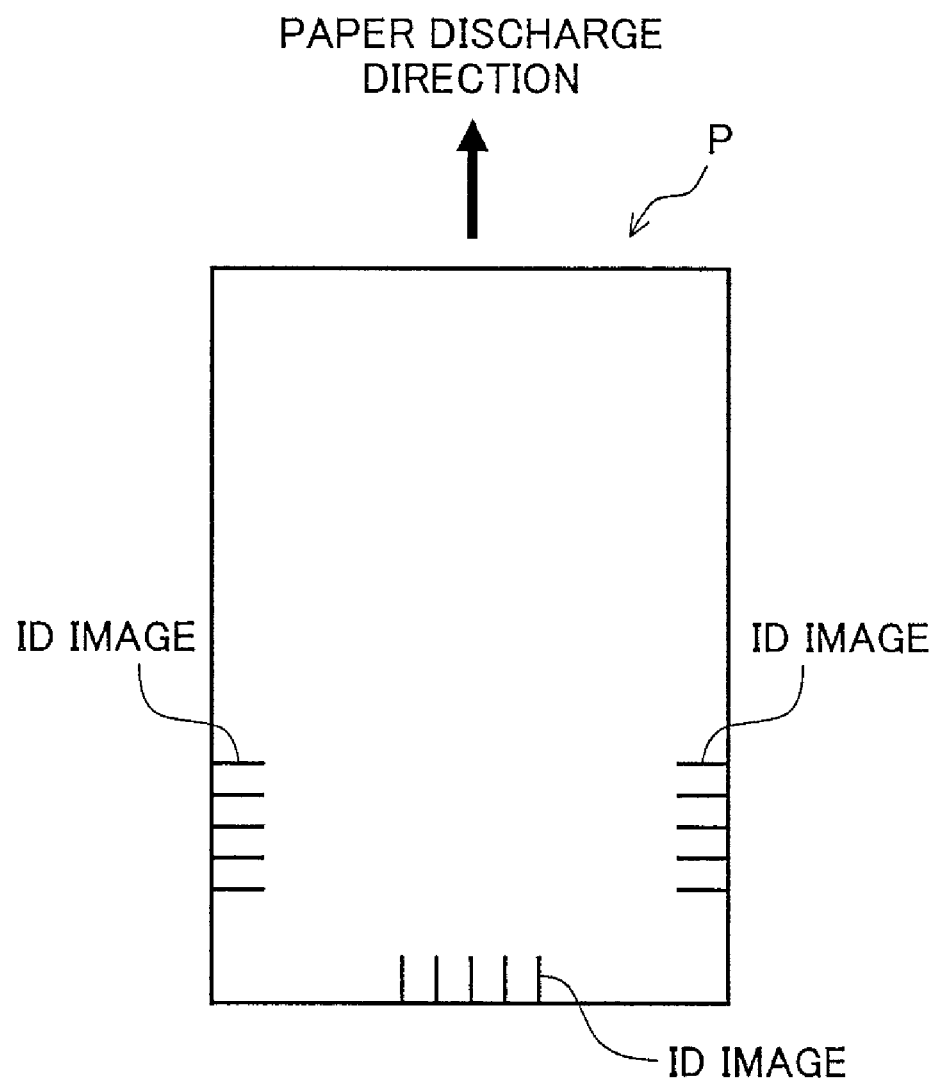

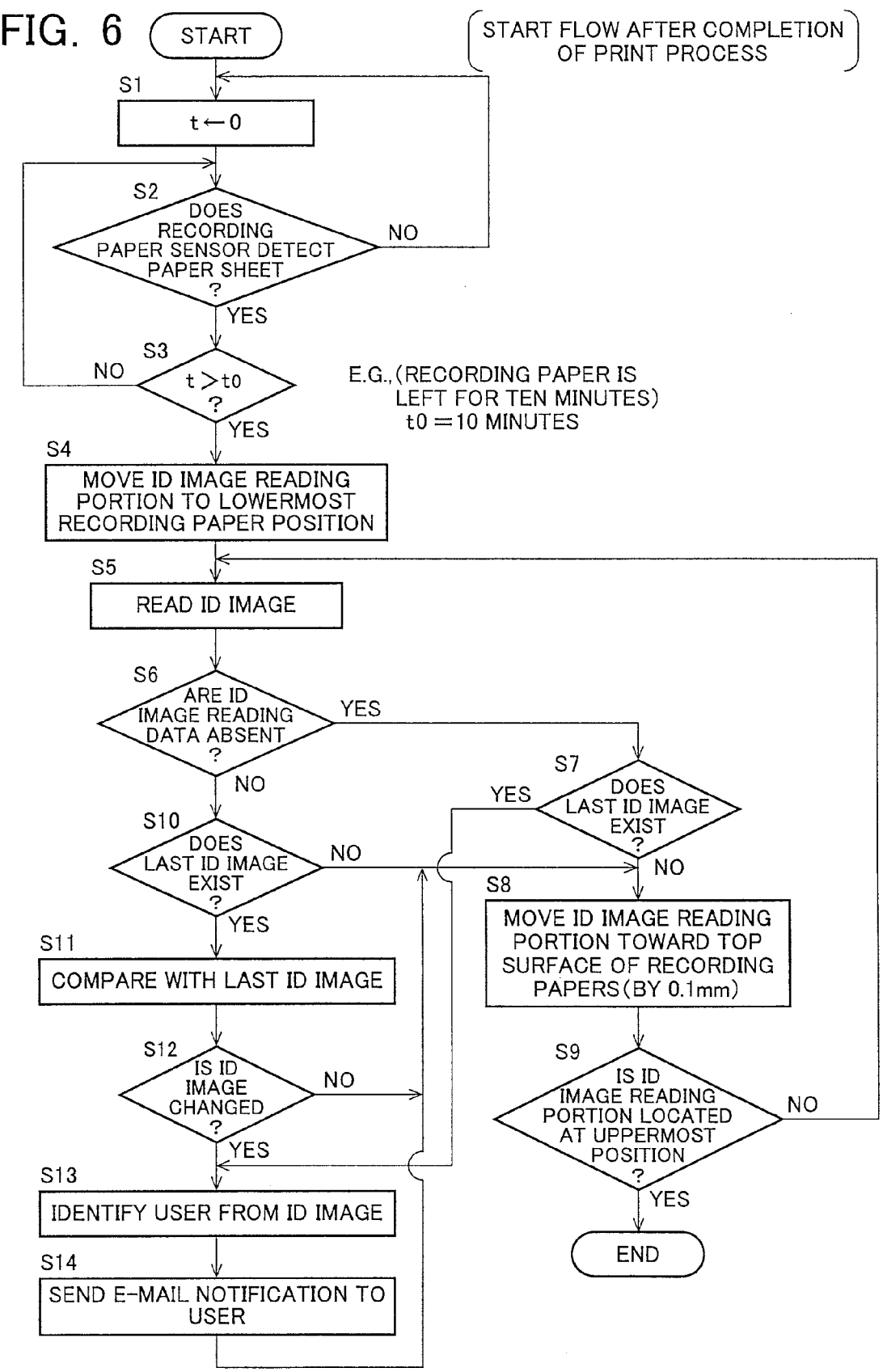

IMAGE FORMING APPARATUS

CROSS-NOTING PARAGRAPH

This Nonprovisional application claims priority under 35 U.S.C. §119(a) on Patent Application No. 2006-288831 filed in JAPAN on Oct. 24, 2006, the entire contents of which are hereby incorporated herein by references.

FIELD OF THE INVENTION

The present invention relates generally to an image forming apparatus, and, more particularly, to an image forming apparatus having a function of synthetically printing an ID image specific to a user on a recording paper and reading the ID image to notify the user of a recording paper (print) forgotten to be taken out.

BACKGROUND OF THE INVENTION

Generally, image forming apparatuses are known that are connected through a network, etc. to terminal apparatuses such as personal computers (PC) for image formation (printing) of image data transmitted from the terminal apparatuses. For example, when printing image data created with a terminal apparatus, a user operates the terminal apparatus to transmit a print instruction to an image forming apparatus. The image forming apparatus receives the print instruction, prints the image data from the terminal apparatus on a recording paper, and discharges a print having an image formed thereon into a predetermined paper discharge tray.

The user directly looks at the paper discharge tray of the image forming apparatus to check whether the print has been discharged in the paper discharge tray after the completion of the image formation. If discharged, the user takes out the print from the paper discharge tray to acquire the print. In this manner, when the user wants to know whether a print has been discharged in the paper discharge tray of the image forming apparatus, the user must directly look at the paper discharge tray at all times or any timing, which is a cumbersome operation for the user.

On the other hand, if a user forgets to remove a print from the paper discharge tray, the print will be left in the paper discharge tray for a prolonged time. Therefore, if a malicious third party exists, the third party may peep at contents of the left print or take away the print, which increases the risk of leakage of important information. Furthermore, If an allowable amount of discharged paper is exceeded in the paper discharge tray, an accumulation amount detecting portion detects the excess to discontinue the printing, and therefore, if the left prints are accumulated, the amount thereof eventually exceeds the allowable amount of discharged paper in the paper discharge tray as above and causes problems such as discontinuation of the printing.

In a conventionally known method of technology for notification of prints forgotten to be taken out, a paper discharge tray is provided for each user, and if a print is left for a predetermined time after the print is discharged into each paper discharge tray, a user corresponding to the paper discharge tray is notified that a print is left. However, in this method, the number of the paper discharge trays needs to be the same as the number of users and it is problematic that the size of the image forming apparatus must be increased to support a multiplicity of users. If the image forming apparatus is implemented without increasing the size thereof, it is problematic that the use of the image forming apparatus is limited to a small number of users corresponding to a small number of the paper discharge trays.

With regard to the above problems, for example, Japanese Laid-Open Patent Publication No. 2000-155506 describes an image forming apparatus not increasing the size of the apparatus configuration and capable of being utilized by a multiplicity of users and the image forming apparatus includes a forgotten print notification function so as not to leave prints for a long time. This image forming apparatus includes an image forming portion that forms images of image data from a PC and an identification code of a user who uses the PC, a placing tray that temporarily places a print having an image formed thereon by the image forming portion, a document reading portion that reads the identification code on the print placed on the placing tray, a transfer device that transfers the print to the document reading portion, and a notifying portion that notifies the PC to cause the user executed the image forming operation to remove the print based on the identification code read by the document reading portion.

However, in the case of the image forming apparatus described in Japanese Laid-Open Patent Publication No. 2000-155506, since the conveying device must be included to convey the prints (in the placing tray) to the reading portion, it is problematic that the apparatus configuration is complicated and increased in size, especially in a reading mechanism.

Moreover, a paper sheet must always be discharged such that a surface with an ID image printed faces upward. However, the print surface of the ID image may face downward due to a paper discharge tray and output conditions such as one-side printing, two-side printing, face-up paper discharge, and face-down paper discharge. For example, if the one-side printing and the face-down paper discharge are specified, if an ID image is printed on the same surface as a print surface of an image, the ID image print surface faces downward when discharged. In this case, it is difficult to read the ID image with the reading portion.

SUMMARY OF THE INVENTION

It is the object of the present invention to provide an image forming apparatus that achieves with a simple apparatus configuration a function of synthetically printing an ID image specific to a user on a recording paper and reading the ID image to notify the user of a recording paper (print) forgotten to be taken out and that can change a print surface and location of an ID image depending on output conditions of recording papers (such as paper discharge destinations, print conditions, and paper discharge conditions).

Another object of the present invention is to provide an image forming apparatus comprising an image forming portion that synthetically prints image data and ID image data specific to a user on a recording paper, a plurality of paper discharging portions that discharges and accumulates the recording papers having the image data and the ID image data synthetically printed by the image forming portion, and an reading portion that reads the ID images of the recording papers accumulated in the paper discharging portions, the image forming apparatus notifying an external device specified by a user corresponding to the ID image read by the reading portion that the recording papers in the paper discharging portion must be removed, the apparatus comprising an output condition setting portion that sets output conditions of the recording papers, the image forming portion printing the image data on a recording paper and the ID image data on an edge of the recording paper in accordance with the output conditions set by the output condition setting portion, the reading portion reading the ID images at the edges of the recording papers while the recording papers are accumulated in the paper discharging portion.

Another object of the present invention is to provide the image forming apparatus, wherein the output condition setting portion sets a paper discharging portion that is a paper discharge destination of a recording paper from the plurality of paper discharging portions, and wherein the image forming portion changes the edge where the ID image data of the recording papers are printed in accordance with the paper discharging portion set as the paper discharge destination by the output condition setting portion and discharges the recording papers into the paper discharging portion such that the recording paper edges having the ID images printed thereon are always rear edges.

Another object of the present invention is to provide the image forming apparatus, wherein the output condition setting portion sets a print condition of the recording papers, and wherein the image forming portion changes the edge where the ID image data of the recording paper are printed in accordance with the print condition set by the output condition setting portion and discharges the recording papers into the paper discharging portion such that the recording paper edges having the ID images printed thereon are always rear edges.

Another object of the present invention is to provide The image forming apparatus, wherein the output condition setting portion sets the print condition of the recording papers to two-side printing that performs printing on both sides of a recording paper or one-side printing that performs printing on one side of a recording paper.

Another object of the present invention is to provide the image forming apparatus, wherein the output condition setting portion sets a paper discharge condition of the recording papers, and wherein the image forming portion changes the surface where the ID image data of the recording paper are printed in accordance with the paper discharge condition set by the output condition setting portion and discharges the recording papers into the paper discharging portion such that the ID image print surface always faces upward.

Another object of the present invention is to provide the image forming apparatus, wherein the output condition setting portion sets the paper discharge condition of the recording papers to face-down paper discharge that discharges the recording papers into the paper discharging portion with an image print surface facing down or face-up paper discharge that discharges the recording papers into the paper discharging portion with the image print surface facing up.

Another object of the present invention is to provide the image forming apparatus, wherein the image forming portion prints the ID image data on one surface of a recording paper, prints the image data on the other surface of the recording paper, and discharges the recording paper into the paper discharging portion with the image print surface facing downward in the case of the face-down paper discharge.

Another object of the present invention is to provide the image forming apparatus, comprising a reversing portion that reverses a conveying direction of a recording paper, wherein the image forming portion prints the ID image data at a leading edge of one surface of a recording paper in the recording paper conveying direction, prints the image data on the other surface of the recording paper after the conveying direction of the recording paper is reversed by the reversing portion, and discharges the recording paper into the paper discharging portion with the image print surface facing downward.

Another object of the present invention is to provide the image forming apparatus, wherein the image forming portion synthetically prints the image data and the ID image data on the same surface of a recording paper and discharges the recording paper into the paper discharging portion with the synthetically printed surface facing upward in the case of the face-up paper discharge and the one-side printing.

Another object of the present invention is to provide the image forming apparatus, wherein the image forming portion prints the image data on one surface of the recording paper and prints the ID image data at the rear edge of the same surface in the recording paper conveying direction.

Another object of the present invention is to provide the image forming apparatus, comprising a reversing portion that reverses a conveying direction of a recording paper, wherein the image forming portion prints the image data on one surface of a recording paper, synthetically prints the image data on the other surface of the recording paper and the ID image data at the rear edge of this surface in the recording paper conveying direction after the conveying direction of the recording paper is reversed by the reversing portion, and discharges the recording paper into the paper discharging portion with the synthetically printed surface facing upward in the case of the face-up paper discharge and the two-side printing.

Another object of the present invention is to provide the image forming apparatus, wherein the discharging portion accumulates the recording papers having the image data and the ID image data synthetically printed by the image forming portion with the ID image print surface facing upward.

Another object of the present invention is to provide the image forming apparatus, wherein when accepting ID image synthesis specification from a user, the output condition setting portion sets a paper discharge destination as the paper discharging portion disposed with the reading portion.

BRIEF DESCRIPTION OF THE DRAWINGS

FIG. 2 depicts an example of an ID image printed on a recording paper;

FIG. 6 is an explanatory flow diagram of an example of an ID image reading process of the image forming apparatus according to one embodiment of the present invention;

PREFERRED EMBODIMENTS OF THE INVENTION

Figure 1:
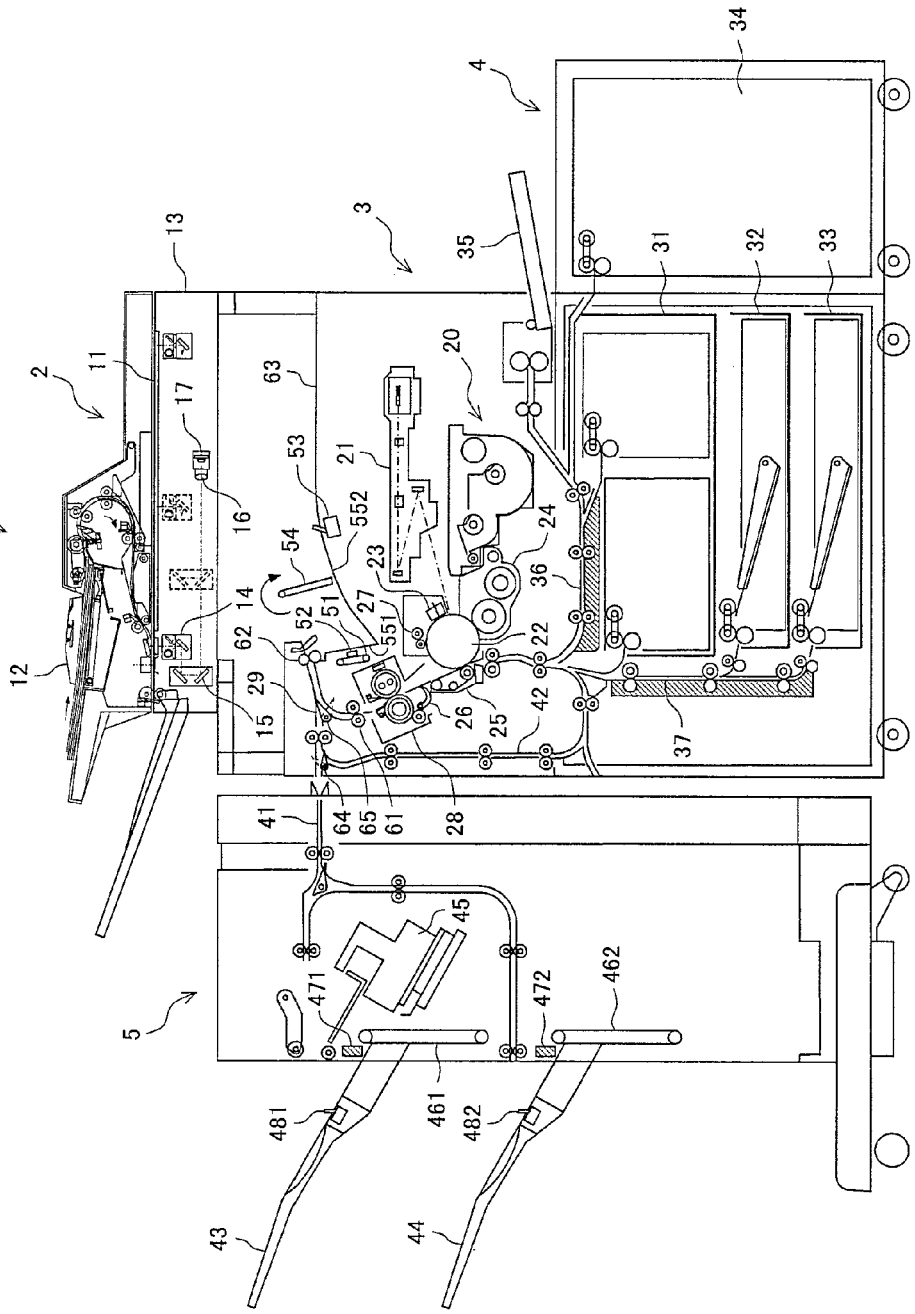
FIG. 1 is a sectional diagram of a principal exemplary configuration of an image forming apparatus according to one embodiment of the present invention.

FIG. 1 is a sectional diagram of a principal exemplary configuration of an image forming apparatus according to one embodiment of the present invention, and 1 indicates an image forming apparatus in FIG. 1. The image forming apparatus 1 is roughly configured by an image reading portion 2, an image forming portion 3, a paper feeding portion 4, and a post-processing apparatus 5.

As shown in FIG. 1, the image reading portion 2 is configured by a document platform 11 made of clear glass, a reversing automatic document feeder (RADF) 12 for automatically supplying a document onto the document platform 11, and a document image reading unit, i.e., a scanner unit 13 for scanning and reading an image of a document placed on the document platform 11.

The RADF 12 is a known apparatus having a plurality of documents set in a predetermined document tray at the same time and automatically delivering the set documents one-by-one onto the document platform 11 of the scanner unit 13. The RADF 12 is configured by a conveying path for one-side documents, a conveying path for two-side documents, a conveying path switching portion, etc., such that the scanner unit 13 is driven to read one side or both sides of the document depending on a user's selection.

The scanner unit 13 is configured by a lamp reflector assembly that exposes a document surface, a first scanning unit 14 equipped with a first reflecting mirror for guiding a reflected light image from a document to a Charge Coupled Device (CCD) 17 for conversion into electric image signals; a second scanning unit 15 equipped with second and third reflecting mirrors, and an optical lens body 16 for focusing the reflected light image on the CCD 17. Scanning control is executed such that the first scanning unit 14 travels from left to right along the document platform 11 at a constant velocity V and that the second scanning unit 15 travels in the same direction at a velocity of V/2.

As a result, with associated operations of the RADF 12 and the scanner unit 13, the image reading portion 2 sequentially places documents to be read on the document platform 11, moves the scanner unit 13 along the undersurface of the document platform 11, and sequentially focuses onto the CCD 17 each line of an image of the document placed on the document platform 11 to read the document image.

The image data acquired by reading the document image with the scanner unit 13 are subjected to various processes and temporarily stored in a memory not shown, and after the image data are output from the memory to the image forming portion 3 in response to an output instruction and are reproduced as a visible image on a photoconductor drum 22, the image is transferred onto a paper sheet to form a toner image.

The image forming portion 3 includes a laser scanning unit (LSU) 21 and an electrophotographic process portion 20 for forming an image. The laser scanning unit 21 includes a semiconductor laser that emits a laser beam depending on the image data read from the memory or image data transferred from an external device such as a personal computer, a polygon mirror that deflects the laser beam at a constant angular velocity, an f-θ lens that corrects the laser beam deflected at the constant angular velocity such that the photoconductor drum 22 of the electrophotographic process portion 20 is scanned at a constant velocity.

The electrophotographic process portion 20 includes a charging apparatus 23, a developing apparatus 24, a transferring apparatus 25, a peeling apparatus 26, a cleaning apparatus 27, and an neutralization apparatus arranged around the photoconductor drum 22 in accordance with a known aspect and also includes a fixing apparatus 28 disposed downstream of the photoconductor drum 22.

The paper feeding portion 4 includes first to third cassettes 31 to 33 and a manual feed tray 35. The first cassette 31 is a tandem tray housing first and second trays and enables the both trays to be pulled out from the apparatus main body at the same time. The second cassette 32 and the third cassette 33 house a third tray and a fourth tray, respectively. That is, the three cassettes (31 to 33) house the four trays. Paper conveying portions 36 and 37 include paper feed rollers, conveying rollers, and resist rollers for conveying paper sheets from the paper feeding portion 4 to a transfer position between the photoconductor drum 22 and the transferring apparatus 25.

Paper sheets are stacked and housed in the four trays within the first to third cassettes 31 to 33 in the paper feeding portion 4 in accordance with the sizes of the paper sheets, and if a user selects a cassette or tray housing the paper sheets of the size desired by the user, the paper sheets are sent out one-by-one from the top of the sheet stack in the tray and are sequentially conveyed through the conveying paths of the paper conveying portions 36 and 37 to the electrophotographic process portion 20.

A paper discharge path 29 is disposed on the downstream side in the paper sheet conveying direction from the fixing apparatus 28, and the paper discharge path 29 is branched into a paper conveying path 41 of the post-processing apparatus 5 and a paper re-conveying portion 42 for both sides copying.

In the laser scanning unit 21 and the electrophotographic process portion 20, the image data read from the memory are formed as an electrostatic latent image on the surface of the photoconductor drum 22 by scanning a laser beam with the laser scanning unit 21; the electrostatic latent image is turned into a visible image, i.e., a toner image by the toner of the developing apparatus 24; and the toner image is transferred onto a surface of a sheet conveyed by the paper feeding portion 4 through electrostatic image transfer by the transferring apparatus 25 and is fixed by the fixing apparatus 28.

The paper sheet having the image formed thereon is sent from the fixing apparatus 28 to the post-processing apparatus 5 or is selectively conveyed to the paper re-conveying portion 42 for both sides copying. The paper sheet sent to the post-processing apparatus 5 is subjected to a predetermined process such as a sort or staple process if necessary, and is stacked in a first discharge tray 43 or a second discharge tray 44. The paper sheet sent to the paper re-conveying portion 42 for both sides copying is reversed and conveyed to the electrophotographic process portion 20 again, and an image is formed on the backside of the paper sheet, which is discharged after the image is fixed.

The image forming apparatus 1 shown in FIG. 1 includes the first to third cassettes 31 to 33 and the manual feed tray 35 in the apparatus main body, and a high-capacity cassette 34 is added as an optional fifth tray. An upwardly biased elevator is included within the high-capacity cassette 34; paper sheets are accumulated in this elevator; a top paper sheet is in contact with a paper feed roller; and the paper sheet is isolated and sent out by rotating the paper feed roller and enters into the paper conveying portion 36 of the apparatus main body. The high-capacity cassette 34 has a high-capacity tray and, therefore, can store standard paper sheets of the most frequently used size, for example, A4 size.

The post-processing apparatus 5 is disposed to the left of the image forming system and includes the first discharge tray 43 and the second discharge tray 44. The second discharge tray 44 is a discharging portion that receives sheets having images formed thereon discharged from the image forming portion 3 through a discharged/received paper conveying path 41 provided at an upper side of the post-processing apparatus 5 to discharge the sheets as it is. The first discharge tray 43 is a discharging portion that discharges sheets subjected to a post-process by a post-processing portion 45 mounted selectively, such as a staple and a punch. The post-processing apparatus 5 is configured such that the sheets having images formed thereon are discharged from the first discharge tray 43 or the second discharge tray 44 selected by a user.

The image forming apparatus 1 supports the two-side printing and a configuration for the two-side printing will hereinafter be described.

A sheet having an image recorded thereon is conveyed through the fixing apparatus 28 and upwardly by a conveying roller 61 and passes through a switch gate 65. If a discharge tray of the sheet is set as a stack tray 63 included in an outer cover of the image forming portion 3, the sheet is discharged into the stack tray 63 by a reverse roller 62. On the other hand, if the two-side image formation or post-process is specified, the sheet is once discharged toward the stack tray 63 by the reverse roller 62. In this case, the sheet is not completely discharged and the reverse roller 62 is reversed while the sheet is kept pinched. The sheet is then reversed and conveyed in the opposite direction, i.e., a direction toward the paper re-conveying portion 42 and the post-processing apparatus 5 selectively mounted for the two-side image formation and post-process.

In this case, the switch gate 65 is switched from a state of the solid line shown (upward) to a state of the broken line (downward). If the two-side image formation is performed, the reversely conveyed sheet passes through the paper re-conveying portion 42 while anther switch gate 64 is in the upward (broken line) state and is supplied to the image forming portion 3 again. On the other hand, the post-process is executed, the sheet is conveyed from the paper re-conveying portion 42 to the post-processing apparatus 5 while the anther switch gate 64 is in the downward (solid line) state to execute the post-process.

The image forming apparatus 1 of the embodiment achieves with a simple apparatus configuration a function of synthetically printing an ID image specific to a user on a recording paper and reading the ID image to notify the user of a recording paper (print) forgotten to be taken out without including a special recording paper conveying portion and can change a print surface and location of the ID image depending on output conditions of recording papers. Therefore, the image forming apparatus 1 includes the image forming portion 3 that synthetically prints image data and ID image data specific to a user on a recording paper, the stack tray (hereinafter, paper discharge tray) 63 that is a paper discharging portion for discharging and accumulating the recording papers having the image data and the ID image data synthetically printed thereon, an ID image reading portion 52 that reads the ID images on the recording papers accumulated in the paper discharge tray 63, an elevating portion 51 configured by a driving roller (motor) and a belt for moving up and down the ID image reading portion 52, a recording paper sensor 53 that detects the presence of the recording papers in the paper discharge tray 63, and an aligning portion (paddler) 54 that aligns the edges of the recording papers such that the edges are shifted from each other.

The ID image reading portion 52 is a line sensor or an area sensor configured by a CCD that is an image pickup device, and is disposed on a position where the ID image can be read at the of the recording paper edges discharged in the paper discharge tray 63.

The paper discharge tray 63 is provided with a transparent alignment surface 551 contacted with the edges of each recording paper such that the ID images at the recording paper edges can be read out by the ID image reading portion 52 and a recording paper stack surface 552 that is slanted relative to the alignment surface 551. Since the recording paper stack surface 552 is downwardly slanted toward the alignment surface 551, each recording paper is slanted relative to the alignment surface 551, and the edges of each recording paper is aligned such that the edges are shifted from each other by the aligning portion 54. This configuration enables the paper discharge tray 63 to accumulate the recording papers with the ID images revealed at the edges of each recording paper, and the ID image reading portion 52 can accurately detect the ID images of each recording paper.

When a print request is accepted from a user, the image forming portion 3 prints image data on a recording paper and prints ID image data at the edge of the recording paper and discharges and accumulates the print in the paper discharge tray 63. While the recording papers are accumulated in the paper discharge tray 63 and the edges of each recording paper contacts with the alignment surface 551, the ID image reading portion 52 reads the ID images at the edges of the recording papers through the alignment surface 551. The ID image data are preliminarily registered in a memory not shown for each user and, for example, if a print request is sent from a PC used by a user, the memory is referenced from user information included in the print request to identify the ID image data corresponding to the user information.

The image forming apparatus 1 includes a communication function such as e-mail to notify an external device specified by a user corresponding to the ID image read by the ID image reading portion 52 that the recording papers in the paper discharge tray 63 must be removed. The external device may be not only a PC but also a portable terminal such as a portable telephone used by the user, and the e-mail address of the external device specified by the user is preliminarily registered and correlated with the ID image data in the image forming apparatus 1.

The discharge destination of recording papers may be the first discharge tray 43 or the second discharge tray 44 included in the post-processing apparatus 5 instead of the paper discharge tray 63. The first discharge tray 43 includes a tray elevating portion 461 configured by a driving roller (motor) and a belt for moving up and down the first discharge tray 43, an ID image reading portion 471 configured by a CCD (line sensor or an area sensor) reading the ID images of the recording papers accumulated in the first discharge tray 43, and a recording paper sensor 481 that detects the presence of the recording papers on the paper discharge tray 43. Similarly, the second discharge tray 44 includes a tray elevating portion 462, an ID image reading portion 472, and a recording paper sensor 482. Although the ID image reading portion is moved up and down to read the ID images of the recording paper edges in the case of the paper discharge tray 63, the ID image reading portion is fixed and the tray is moved up and down to read the ID images of the recording paper edges in the case of the first discharge tray 43 or the second discharge tray 44.

The image forming apparatus 1 of the embodiment is not limited to the form of moving up and down the ID image reading portion to read the ID images and may be the form of fixing the ID image reading portion and moving up and down the paper discharge tray to read the ID images.

FIG. 2 depicts an example of an ID image printed on a recording paper, and P indicates a recording paper in FIG. 2. On the recording paper P, the ID image is synthetically printed at any one of the edges of three sides except the leading edge toward the paper discharge direction (recording paper conveying direction) shown by an arrow of FIG. 2. The ID image synthetically formed at the leading edge of a recording paper is not preferable since winding at the time of fixing is likely to occur. Therefore, it is desirable to avoid the leading edge and synthetically print the ID image at the edges of three sides other than the leading edge. The ID image is, for example, a barcode indicating identification information specific to a user and this identifies a user who executes printing.

Figure 3A:
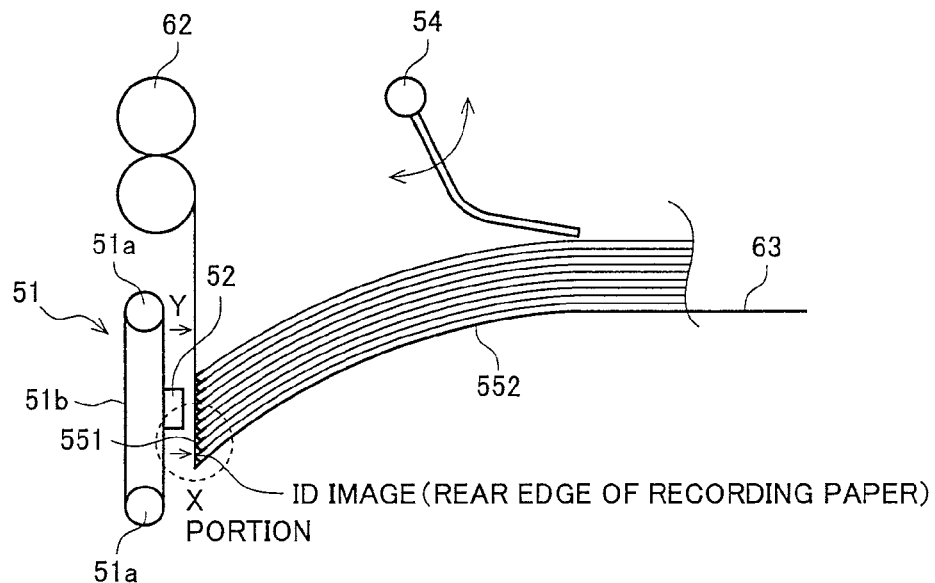
FIGS. 3A to 3C depict a peripheral exemplary configuration of an ID image reading portion included in the image forming apparatus according to one embodiment of the present invention.
Figure 3B:
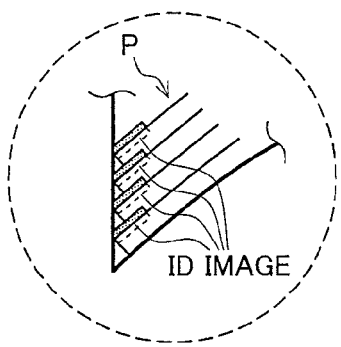
Figure 3C:
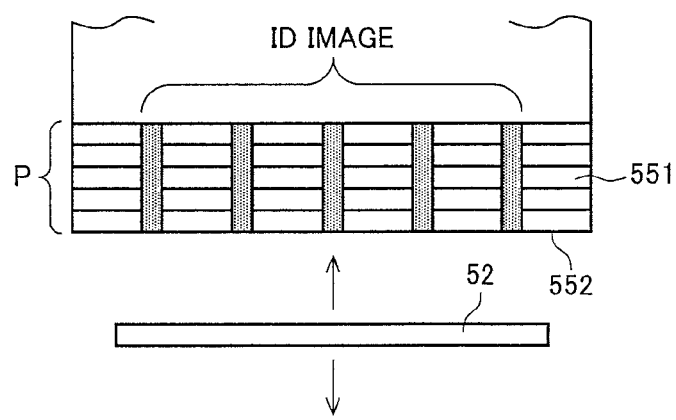

FIGS. 3A to 3C depict a peripheral exemplary configuration of the ID image reading portion 52 included in the image forming apparatus 1 according to one embodiment of the present invention. FIG. 3A is a side view of a peripheral configuration of the ID image reading portion 52; FIG. 3B is an enlarged view of an X portion shown in FIG. 3A; and FIG. 3C is a diagrammatic view of a rear edge cross-section of the recording papers P when an alignment surface shown in FIG. 3A is viewed from the Y direction.

In FIG. 3A, a plurality of the recording papers P is discharged and accumulated in the paper discharge tray 63 and an ID image is printed at the rear edge of each recording paper P in the recording paper conveying direction. The rear edges of each recording paper P contact with the alignment surface 551, and the ID image reading portion 52 is moved up and down by the elevating portion 51 to read the ID images printed at the rear edges of each recording paper P with the ID image reading portion 52. The elevating portion 51 is configured by a drive system 51*a* consisting of a driving roller (motor) and a driven roller and a belt 51*b* that is a power transmitting portion between the both rollers and moves up and down the ID image reading portion 52 to a position where the ID images can be read.

As shown in FIG. 3B, although a barcode is printed as the ID image at the rear edge of the recording paper, the print portion of the barcode has a thickness greater than that of the recording paper P by toner and some amount of toner infiltrates into the recording paper P. While a plurality of the recording papers P is stacked, since the barcode portions overlap in the rear edge cross-section as shown in FIG. 3C to make the barcode portions black and other portions white, the rear edge cross-section has color densities (contrast). Therefore, the barcodes can accurately be read by scanning the rear edge cross-section with the ID image reading portion 52.

As shown in FIG. 3C, if a plurality of the recording papers P of the same user is accumulated in the paper discharge tray 63, the ID images printed at the same position of the rear edges overlap at substantially the same position. Therefore, as the number of the recording papers P increases, the contrast of the ID images becomes sharper at the rear edge cross-section, and the reading accuracy of the ID image reading portion 52 is improved. Although the print surface of the ID image may be one side or two sides of the recording paper P, since the print portion of the ID image becomes thicker than the one-side case when the ID image is printed on two sides, the ID images can be read from a smaller number of sheets than the one-side case and it becomes easier than the one-side case to read the ID images from the same number of sheets.

Figure 4:
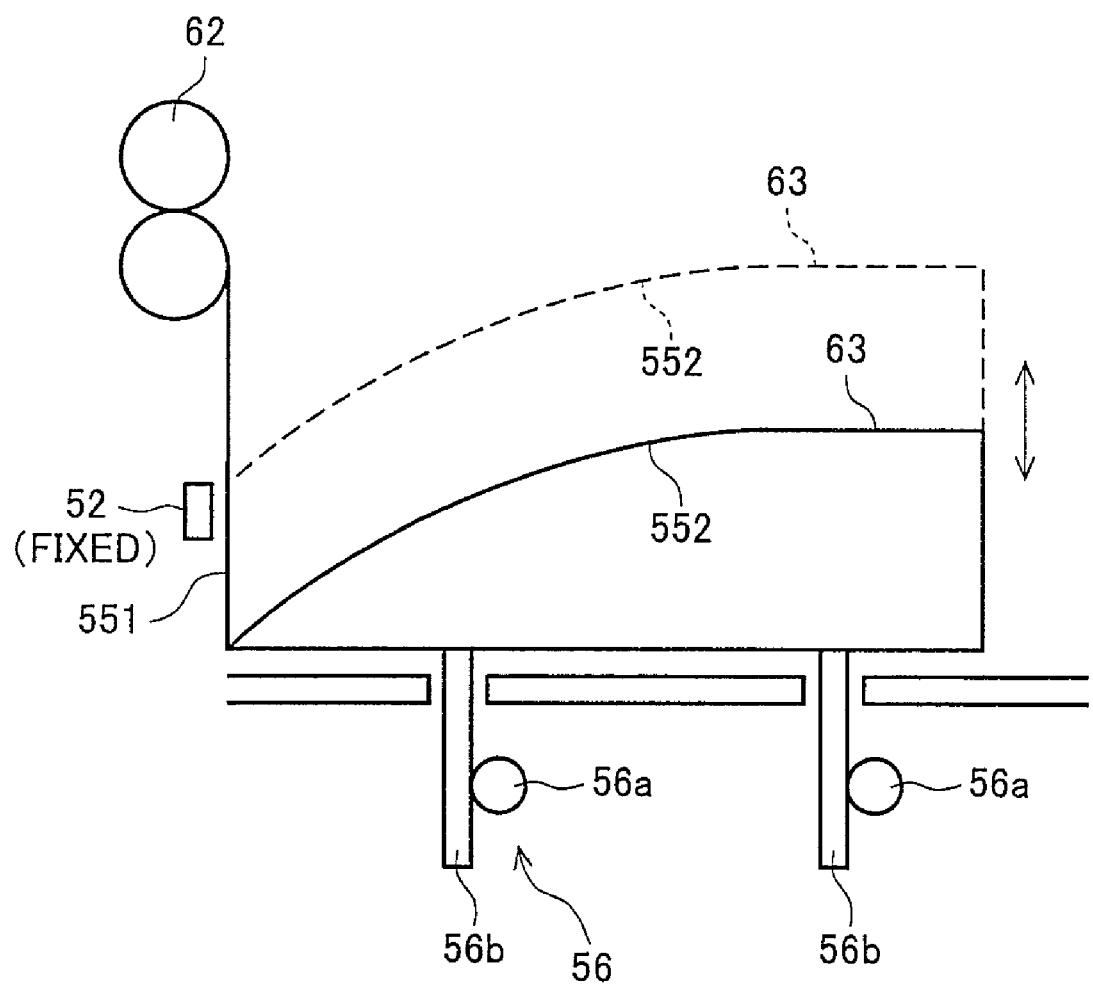
FIG. 4 depicts a peripheral configuration of the ID image reading portion included in the image forming apparatus according to a variation of one embodiment of the present invention.

FIG. 4 depicts a peripheral configuration of the ID image reading portion 52 included in the image forming apparatus 1 according to a variation of one embodiment of the present invention. Instead of the elevating portion 51, the image forming apparatus 1 includes a tray elevating portion 56 that moves up and down the paper discharge tray 63. While the ID image reading portion 52 is fixed, the tray elevating portion 56 moves up and down the paper discharge tray 63 to read the ID images at the rear edges of the recording papers. The tray elevating portion 56 is configured by a driving roller 56*a* and a support member 56*b* supporting the paper discharge tray 63 and moved up and down by the driving roller 56*a*, and the paper discharge tray 63 is moved up and down to a position where the ID images can be read.

Figure 5:
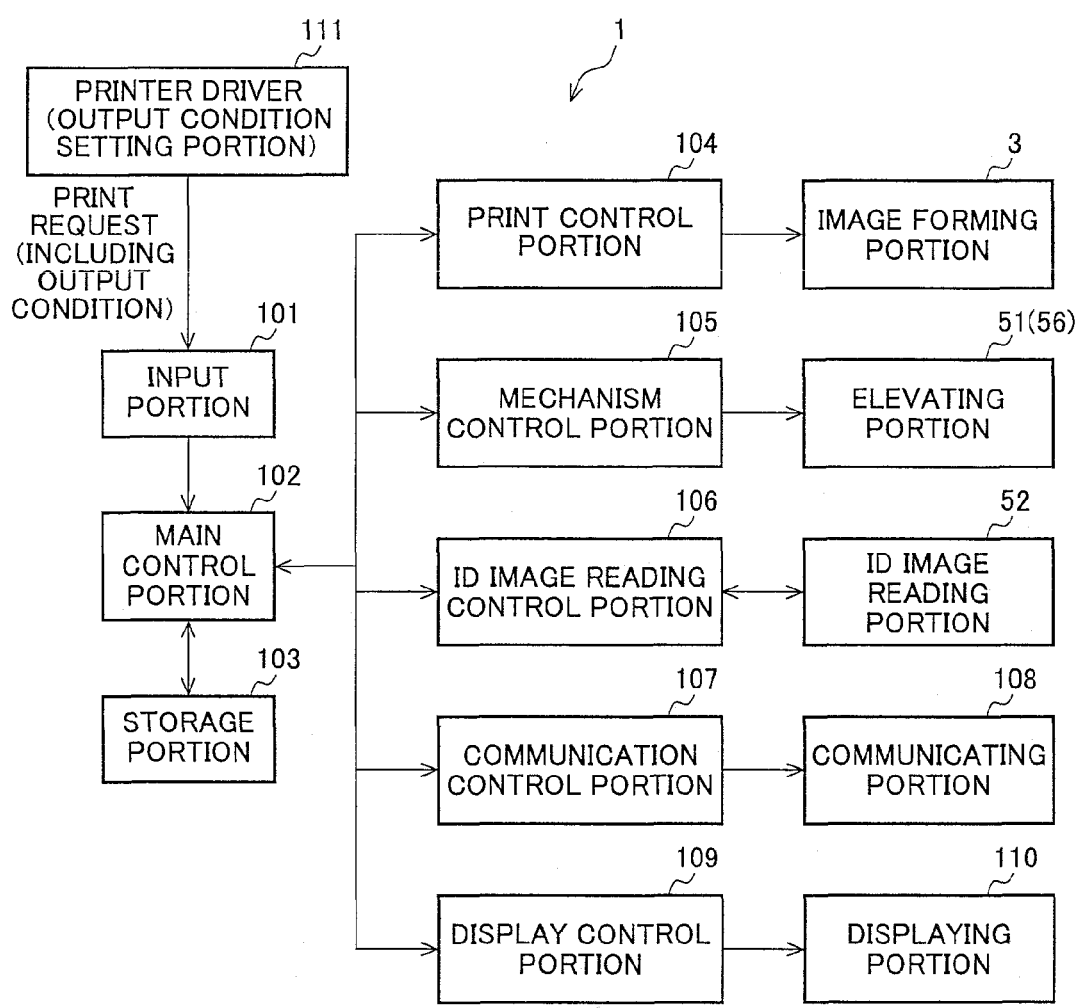
FIG. 5 is a functional block diagram of an exemplary configuration of a controlling portion included in the image forming apparatus according to one embodiment of the present invention.

FIG. 5 is a functional block diagram of an exemplary configuration of a controlling portion included in the image forming apparatus 1 according to one embodiment of the present invention. The image forming apparatus 1 includes an input portion 101 that accepts a print request from an external device such as PC through network, etc., a main control portion 102 that controls the entire apparatus, a storage portion (memory) 103 that has user information such as ID image data and e-mail addresses stored thereon, a print control portion 104 that controls the operation of the image forming portion 3, a mechanism control portion 105 that controls the operation of the elevating portion 51 or the tray elevating portion 56, an ID image reading control portion 106 that controls the operation of the ID image reading portion 52, a communication control portion 107 that controls the operation of a communicating portion 108 such as e-mail, a display control portion 109 that controls the operation of a displaying portion 110 such as a liquid crystal display displaying various pieces of information, and a printer driver 111 that corresponds to an output condition setting portion of the present invention.

The main control portion 102 is connected to the sub-control portions, i.e., the print control portion 104, the mechanism control portion 105, the ID image reading control portion 106, the communication control portion 107, and the display control portion 109 and generally manages the sub-control portions to control the entire apparatus.

When the input portion 101 accepts a print request from a user, the print control portion 104 controls the image forming portion 3 to print image data on a recording paper and ID image data at the edge of the recording paper and drives the print to be discharged and accumulated in the paper discharge tray 63. For example, when a predetermined time (e.g., ten minutes) has elapsed after the recording paper was left in the paper discharge tray 63, the mechanism control portion 105 controls the elevating portion 51 and the ID image reading control portion 106 controls the ID image reading portion 52 to read the ID image at the edge of the recording paper through the alignment surface 551. The ID image data are preliminarily registered in the storage portion 103 for each user as describe above and, for example, if a print request is sent from a PC used by a user, the storage portion 103 is referenced from user information included in the print request to identify the ID image data corresponding to the user information.

The communication control portion 107 controls the communicating portion 108 to transmit an e-mail notifying an external device specified by the user corresponding to the ID image read by the ID image reading portion 52 that the recording papers in the paper discharge tray 63 must be removed. The external device may be not only a PC but also a portable terminal such as a portable telephone used by the user, and the e-mail address of the external device specified by the user is preliminarily registered and correlated with the ID image data in the image forming apparatus 1.

Leaving a large amount of recording papers in the paper discharge tray 63 is inconvenient to other users. Therefore, if a predetermined amount (e.g., 100) or more of recording papers is left in the paper discharge tray 63, the external device specified by the user may be notified. In this case, the number of prints is stored in the storage portion 103 for each job. The method of the notification is not limited to e-mail and a left-sheet warning message for left sheets may be displayed on the displaying portion 110 along with e-mail.

FIG. 6 is an explanatory flow diagram of an example of an ID image reading process of the image forming apparatus 1 according to one embodiment of the present invention. First, the image forming apparatus 1 sets a count t of a timer to "0" after a print process (step S1) and determines whether the recording paper sensor 53 detects the recording paper P (step S2). If the recording paper P is detected (YES), it is determined whether a predetermined time t0 (e.g., ten minutes) has elapsed after the recording paper P was left (step S3). If the recording paper P is not detected at step S2 (NO), the flow goes back to step S1 to wait for completion of print process.

If the predetermined time t0 has not elapsed after the recording paper P was left at step S3 (NO), the image forming apparatus 1 goes back to step S2 to repeat the process. If the predetermined time t0 has elapsed after the recording paper P was left at step S3 (YES), the ID image reading portion 52 is moved to the lowermost recording paper position (step S4).

The image forming apparatus 1 then executes an ID image reading process with the ID image reading portion 52 (step S5) and determines absence of the ID image reading data (step S6). If the ID image reading data are absent (YES), it is determined whether a last ID image exists (step S7). If no last ID image exists (NO), the ID image reading portion 52 is moved toward the top surface direction of the recording papers (by 0.1 mm) (step S8). The last ID image is an ID image read by the ID image reading portion 52 at a position lower than the current position by 0.1 mm toward the bottom surface direction of the recording papers. This also applies to steps S10 and S11 described later. The image forming apparatus 1 determines whether the ID image reading portion 52 has moved to the uppermost position (step S9); if the ID image reading portion 52 has moved to the uppermost position (YES), the flow is simply terminated; or if the ID image reading portion 52 has not moved to the uppermost position (NO), the flow goes to step S5 to repeat the process. If the last ID image exists at step S7 (YES), the flow goes to step S13 to transmit an e-mail to a user corresponding to the last ID image.

Figure 7A:
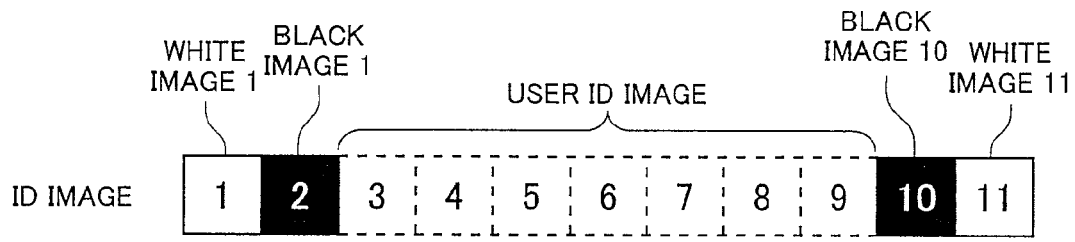
FIGS. 7A and 7B are explanatory views of a method of determining presence of ID image reading data.
Figure 7B:
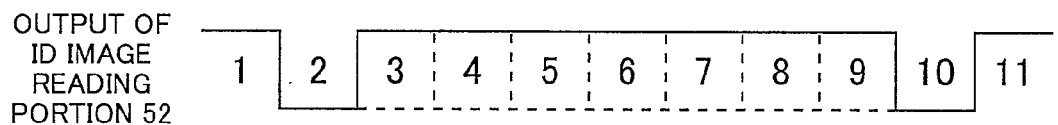

At step S6, the image forming apparatus 1 determines whether the ID image reading data exist. For all the ID images, as shown in FIG. 7A, the format of the ID images is preliminarily defined such that a group of white and black images is located at both ends (a group of a white image 1 and a black image 2, and a group of a black image 10 and a white image 11). A group of white and black images set for each user (a user ID image) is located between the sets of white and black images at both ends. With regard to the presence of the ID image reading data, it is determined that the ID image reading data exist if all of the white image 1, the black image 2, the black image 10, and the white image 11 exist at certain positions on both sides of the output of the ID image reading portion 52. FIG. 7B shows the output of the ID image reading portion 52 when the ID image reading data exist.

Figure 8A:
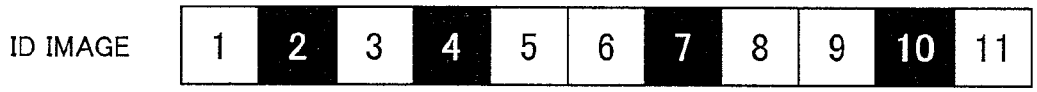
FIGS. 8A and 8B depict arrangement of an actual ID image and an output example of the ID image reading portion.
Figure 8B:
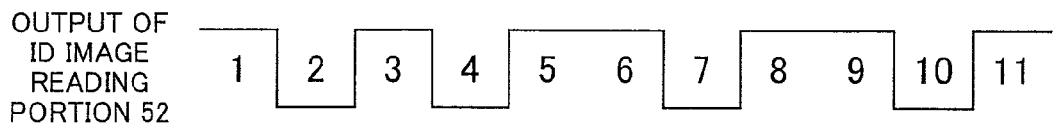

FIG. 8A shows an example of an actual ID image including a user ID image. A combination of white and black images is differently set for each user at center positions 3 to 9 except the image positions 1, 2, 10, and 11 at both ends. FIG. 8B shows the output of the ID image reading portion 52 of this case.

If the ID image reading data exist at step S6 (NO), the read ID image is stored in the storage portion 103 and it is then determined whether the last ID image exists (step S10). If the last ID image exists (YES), the last ID image is compared with the ID image read and stored just before (step S1). It is determined whether the ID image is changed (step S12). If the ID image is not changed (NO), the flow goes to step S8 to repeat the process. If no last ID image exists at step S10 (NO), the flow also goes to step S8 to repeat the process. If the ID image is read at step S5 for the first time, the last ID image is not stored and therefore, the determination is "NO" at stop S10. If the ID image is changed at step S12 (YES), a user is identified from an ID image immediately before the change (as shown in FIG. 9B described later) (step S13), and the user is notified by e-mail (step S14). The flow goes to step S8 to repeat the process.

Figure 9A:
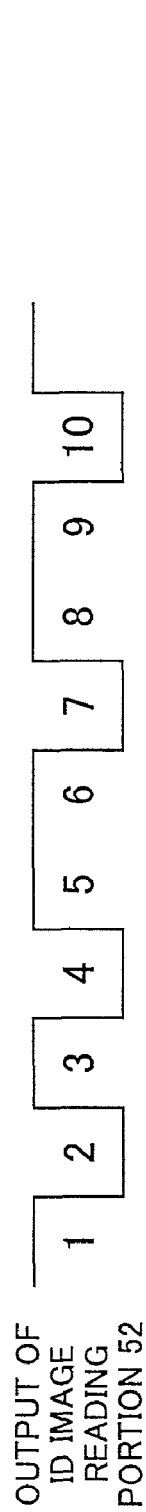
FIGS. 9A to 9C depict output examples of the ID image reading portion when the ID image reading portion moves.
Figure 9B:
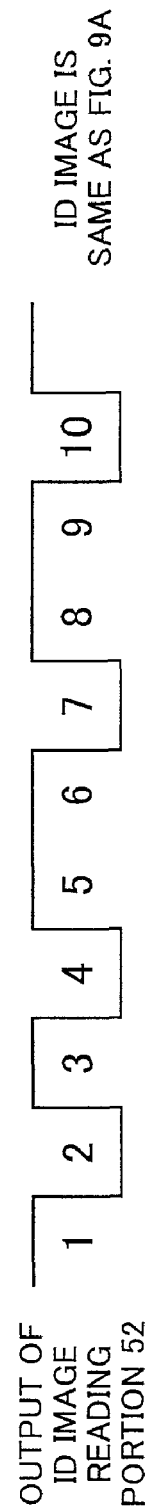
Figure 9C:
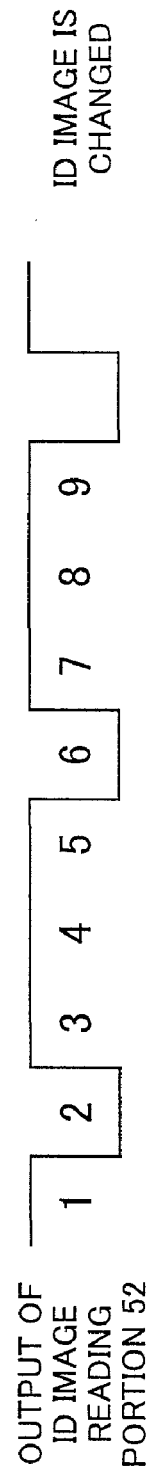

FIGS. 9A to 9C depict the outputs of the ID image reading portion 52 when the ID image reading portion 52 moves. With regard to the process of above step S12, FIGS. 9A and 9B show an example of the output of the ID image reading portion 52 when the output is not changed before and after the ID image reading portion 52 is moved. FIG. 9C shows an example of the output of the ID image reading portion 52 when the output is changed before and after the ID image reading portion 52 is moved. If the ID image is changed, i.e., if the output of the ID image reading portion 52 is changed from the state shown in FIG. 9B to the state shown in FIG. 9C, a user is identified for the ID image shown in FIG. 9B immediately before the change and the user is notified by e-mail.

Figure 10:
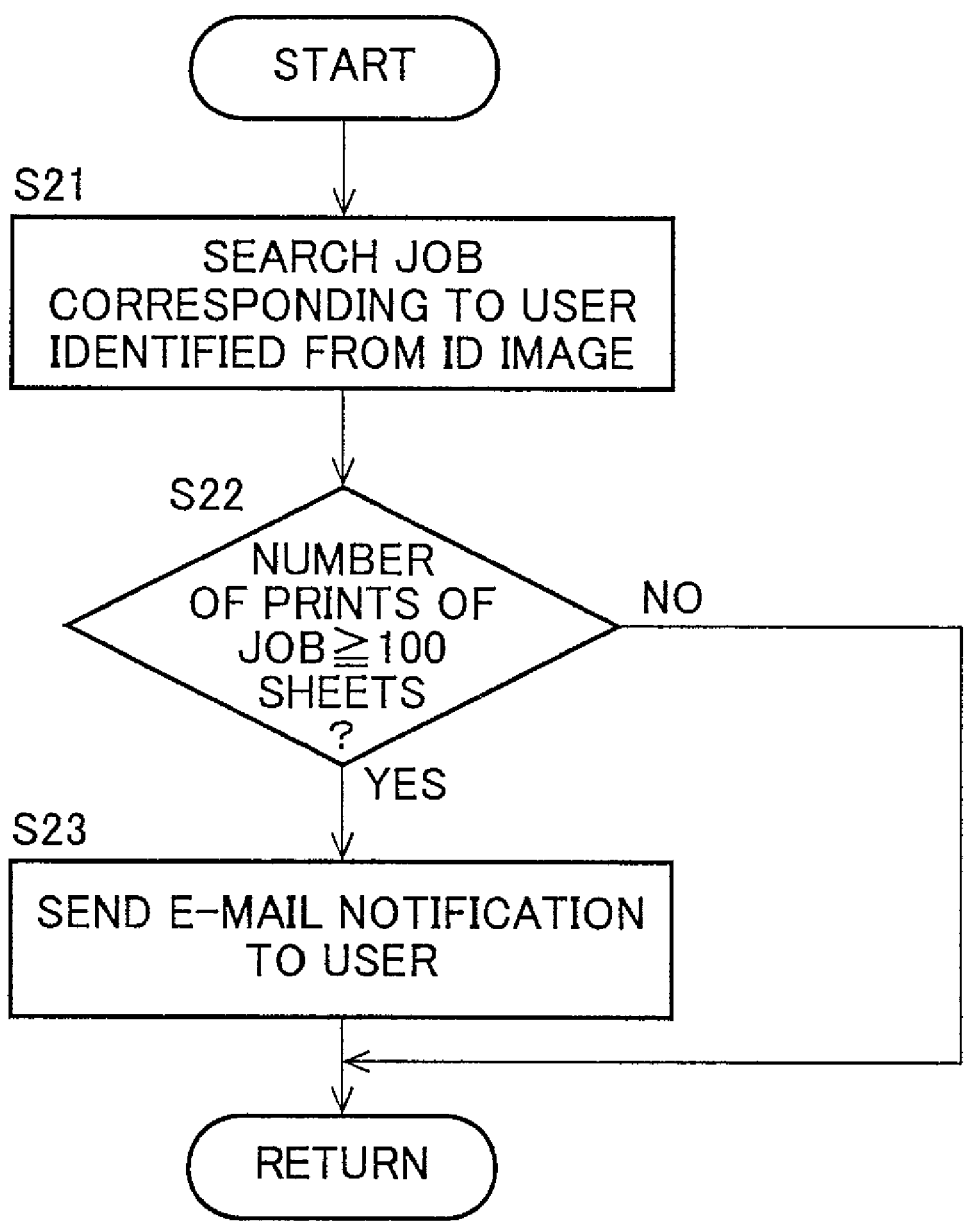
FIG. 10 is an explanatory flow diagram of an example of a process of notifying an external device specified by a user when a predetermined number or more of recording papers is left in a paper discharge tray.

Description will be made of the case that the external device specified by the user is notified when a predetermined amount (e.g., 100) or more of recording papers is left in the paper discharge tray 63. In this embodiment, a flow shown in FIG. 10 is executed instead of the process of step S14 shown in FIG. 6. The image forming apparatus 1 has stored the number of prints and users in the storage portion 103 for each job, and when a user is identified by the ID image, a job corresponding to the identified user is identified (step S21), and it is determined whether the number of prints of the identified job is 100 or more (step S22). If the number of prints is 100 or more (YES), the e-mail notification is executed (step S23). On the other hand, if the number of prints is less than 100 (NO), the flow is simply terminated.

Figure 11:
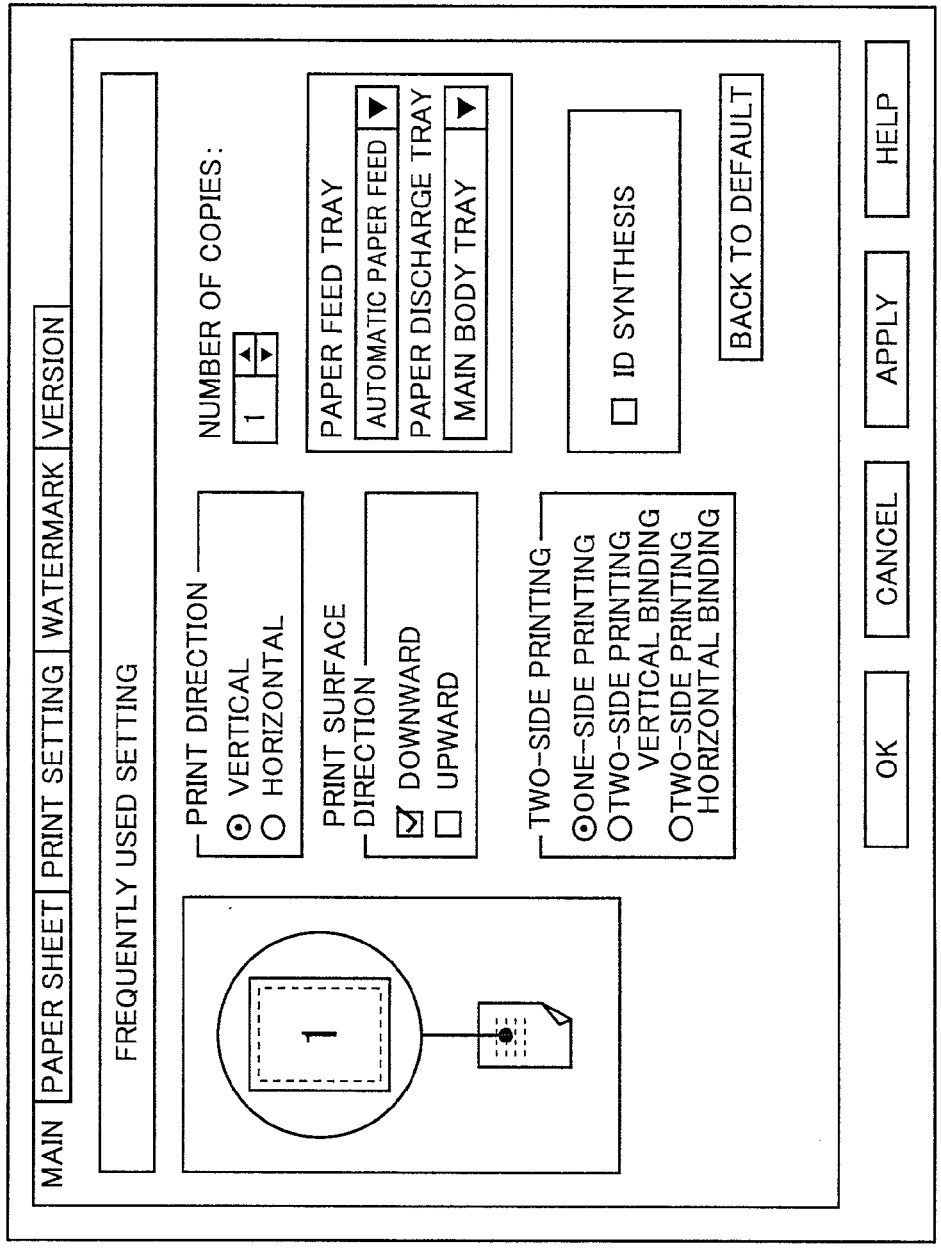
FIG. 11 depicts an example of an output condition setting screen of a printer driver that is an output condition setting portion of the present invention.

FIG. 11 depicts an example of an output condition setting screen of the printer driver that is an output condition setting portion of the present invention. In FIG. 5 described above, the printer driver 111 is installed in an external device such as PC to display an output condition setting screen on a displaying portion included in the external device in accordance with user operation. From the output condition setting screen shown in FIG. 11, output conditions of recording papers can be selected and specified for each item which is "print direction (vertical, horizontal)", "print surface direction (upward, downward)", "two-side printing (one-side printing, two-side printing vertical binding, two-side printing horizontal binding)", "number of copies", "paper feed tray", "paper discharge tray", and "ID synthesis", for example. The "two-side printing" corresponds to a print condition and can be set to one-side printing or two-side printing. The "print surface direction" corresponds to a paper discharge condition and can be set to the face-down paper discharge for discharging paper sheets with the print surfaces facing downward or the face-up paper discharge for discharging paper sheets with the print surfaces facing upward. The "paper discharge tray" corresponds to a paper discharge destination of the present invention and can be set to any one of the paper discharge tray 63, the first discharge tray 43, and the second discharge tray 44.

The output conditions set by the printer driver 111 are input from the input portion 101. The print control portion 104 controls the image forming portion 3, and the image forming portion 3 prints image data on a recording paper and the ID image data at the edge of the recording paper in accordance with the output conditions and discharges the print into a paper discharge tray specified in the output conditions. The ID image reading control portion 106 controls ID image reading portion 52, and ID image reading portion 52 reads the ID images at the edges of the recording papers while the recording papers are accumulated in the paper discharge tray specified in the output conditions.

The ID image printing method will hereinafter be described for each output condition that can be set by the printer driver 111 with reference to specific examples. An image print surface of a recording paper is referred to as a front surface; the face-down paper discharge means that a paper sheet is discharged with the front surface facing downward (i.e., the back surface facing upward); and the face-up paper discharge means that a paper sheet is discharged with the front surface facing upward (i.e., the back surface facing downward).

In a first example, a paper discharge tray is selected that is a paper discharge destination of a recording paper among a plurality of the paper discharge tray (the paper discharge tray 63, the first discharge tray 43, and the second discharge tray 44) on the output condition setting screen of the printer driver 111. If the first discharge tray 43 or the second discharge tray 44 is set as the paper discharge destination, the recording paper is not discharged into the paper discharge tray 63, and the conveying direction of the recording paper is reversed by the reverse roller 62. That is, since the conveying direction is reversed, the rear edge of the recording paper becomes the leading edge and the leading edge becomes the rear edge, i.e., the leading and rear edges are exchanged.

Therefore, the image forming portion 3 changes an edge where the ID image data of the recording paper is printed in accordance with the paper discharge tray set as the paper discharge destination and discharges the paper sheets in the paper discharge tray such that the recording paper edges having the ID images printed thereon are always the rear edges. That is, if the paper discharge tray 63 is set, the ID image data are printed at the rear edge of the recording paper in the conveying direction and the recording paper is directly discharged in the paper discharge tray 63. On the other hand, if the first discharge tray 43 or the second discharge tray 44 is set, the ID image data are printed at the leading edge of the recording paper in the conveying direction. The conveying direction of this recording paper is reversed by the reverse roller 62 such that the ID image is located at the rear edge of the recording paper in the conveying direction. As a result, the recording paper edges having the ID images printed thereon are always the rear edges when the paper sheets are discharged in the first discharge tray 43 or the second discharge tray 44.

In a second example, the one-side printing or the two-side printing is set for the print condition on the output condition setting screen of the printer driver 111. If the two-side printing is set, a recording paper having one printed surface is not discharged in the paper discharge tray 63; printing is performed on the other surface after the conveying direction of the recording paper is reversed by the reverse roller 62; and the paper sheet is eventually discharged in the paper discharge tray 63. That is, since the conveying direction is reversed, the rear edge of the recording paper becomes the leading edge and the leading edge becomes the rear edge, i.e., the leading and rear edges are exchanged as is the case with the first example.

Therefore, the image forming portion 3 changes the edge where the ID image data of the recording paper are printed in accordance with the one-side printing or the two-side printing and discharges the paper sheets into the paper discharge tray such that the recording paper edges having the ID images printed thereon are always the rear edges. That is, if the one-side printing is set, the ID image data are printed at the rear edge of the recording paper in the conveying direction and the recording paper is directly discharged in the paper discharge tray 63. On the other hand, if the two-side printing is set, the ID image data are printed at the leading edge of the recording paper in the conveying direction. The conveying direction of this recording paper is reversed by the reverse roller 62 such that the ID image is located at the rear edge of the recording paper in the conveying direction. As a result, the recording paper edges having the ID images printed thereon are always the rear edges when the paper sheets are discharged in the paper discharge tray 63 after two-side printing.

In a third example, the face-down paper discharge or the face-up paper discharge is set for the paper discharge condition of the recording papers on the output condition setting screen of the printer driver 111. For example, if the one-side printing and the face-up paper discharge is set in the image forming apparatus 1, since the paper sheets are always discharged with the front surfaces, i.e., the image print surfaces facing upward, the image data and the ID image data may be printed and discharged on the front surface. On the other hand, if the one-side printing and the face-down paper discharge is set in the image forming apparatus 1, since the paper sheets are always discharged with the front surfaces, i.e., the image print surfaces facing downward, the paper sheets are discharged with the ID images facing downward if the ID image data are printed on the front surface.

Therefore, the image forming portion 3 changes the surface where the ID image data of the recording paper are printed in accordance with the face-down paper discharge or the face-up paper discharge and discharges the paper sheets in the paper discharge tray such that the ID image print surfaces always face upward. To read the ID images in the image forming apparatus 1, the ID image print surfaces must face upward while the recording papers are stacked in the paper discharge tray, and the ID image must be formed at the rear edge of the recording paper in the recording paper conveying direction.

Therefore, in the case of the one-side printing and the face-down paper discharge, the image forming portion 3 prints the ID image data at the leading edge in the recording paper conveying direction on one surface (back surface) of the recording paper, prints image data on the other surface (front surface) of the recording paper after the conveying direction of the recording paper is reversed by the reverse roller 62, and discharges the paper sheet in the paper discharge tray 63 with the image print surface (front surface) facing downward. In the case of the two-side printing and the face-down paper discharge, the image forming portion 3 prints the image data on one surface (back surface) of the recording paper as well as the ID image data at the leading edge in the recording paper conveying direction on the same surface, prints image data on the other surface (front surface) of the recording paper after the conveying direction of the recording paper is reversed by the reverse roller 62, and discharges the paper sheet in the paper discharge tray 63 with the image print surface (front surface) facing downward.

In the case of the face-up paper discharge and the one-side printing, the image forming portion 3 synthetically print the image data and the ID image data on the same surface (front surface) of the recording paper and discharges the paper sheet in the paper discharge tray 63 with the synthetically printed surface facing upward. In this case, the image forming portion 3 prints the image data on the front surface of the recording paper and prints the ID image data at the rear edge of the recording paper conveying direction on the same surface. In the case of the face-up paper discharge and the two-side printing, the image forming portion 3 prints the image data on one surface (back surface) of the recording paper, synthetically prints the image data on the other surface (front surface) of the recording paper and the ID image data at the rear edge of the recording paper conveying direction on the same surface after the conveying direction of the recording paper is reversed by the reverse roller 62, and discharges the paper sheet in the paper discharge tray 63 with the synthetically printed surface (front surface) facing upward.

Figure 12:
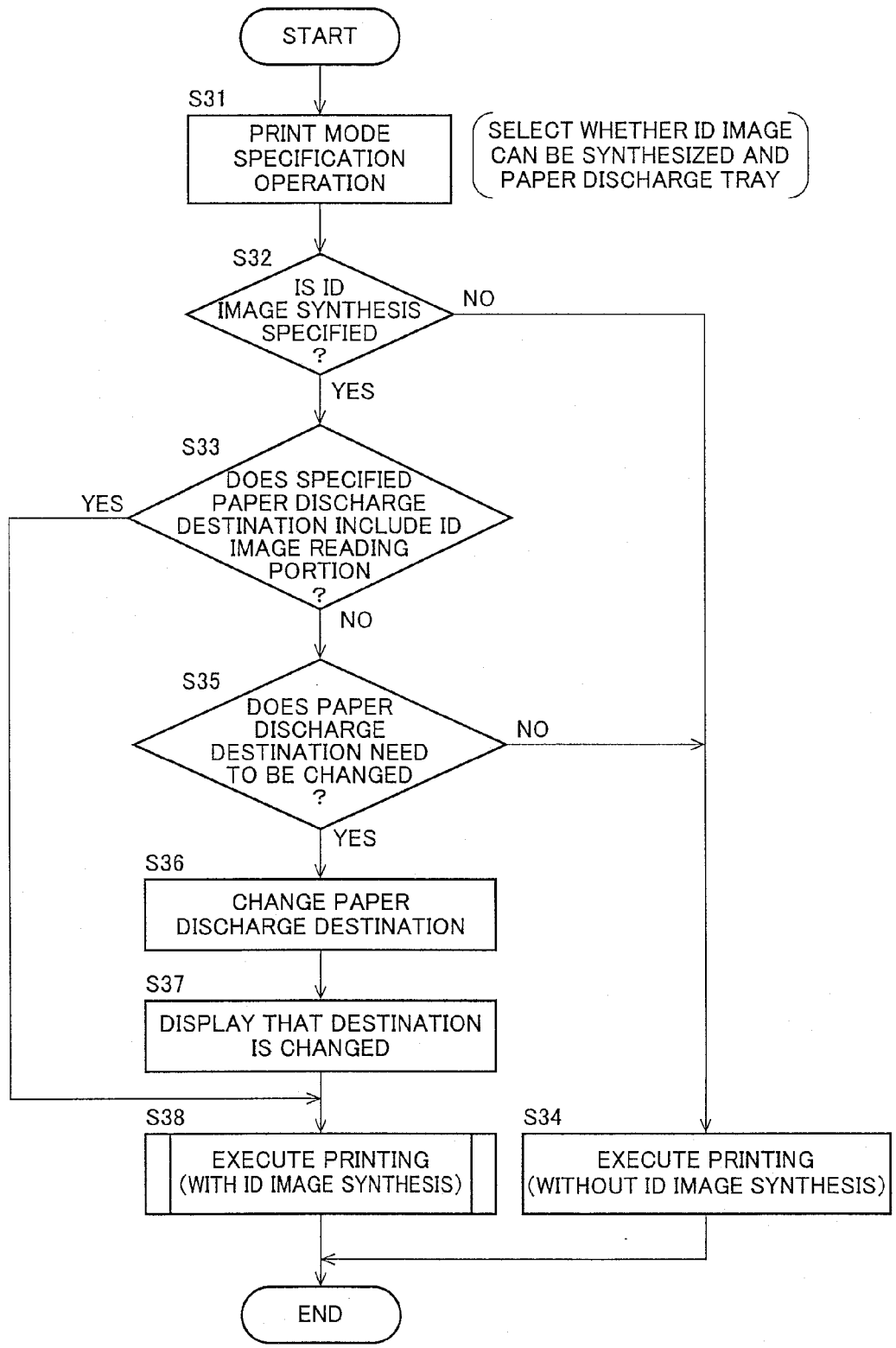
FIG. 12 is an explanatory flow diagram of an example of an ID image printing method of the present invention.
Figure 13:
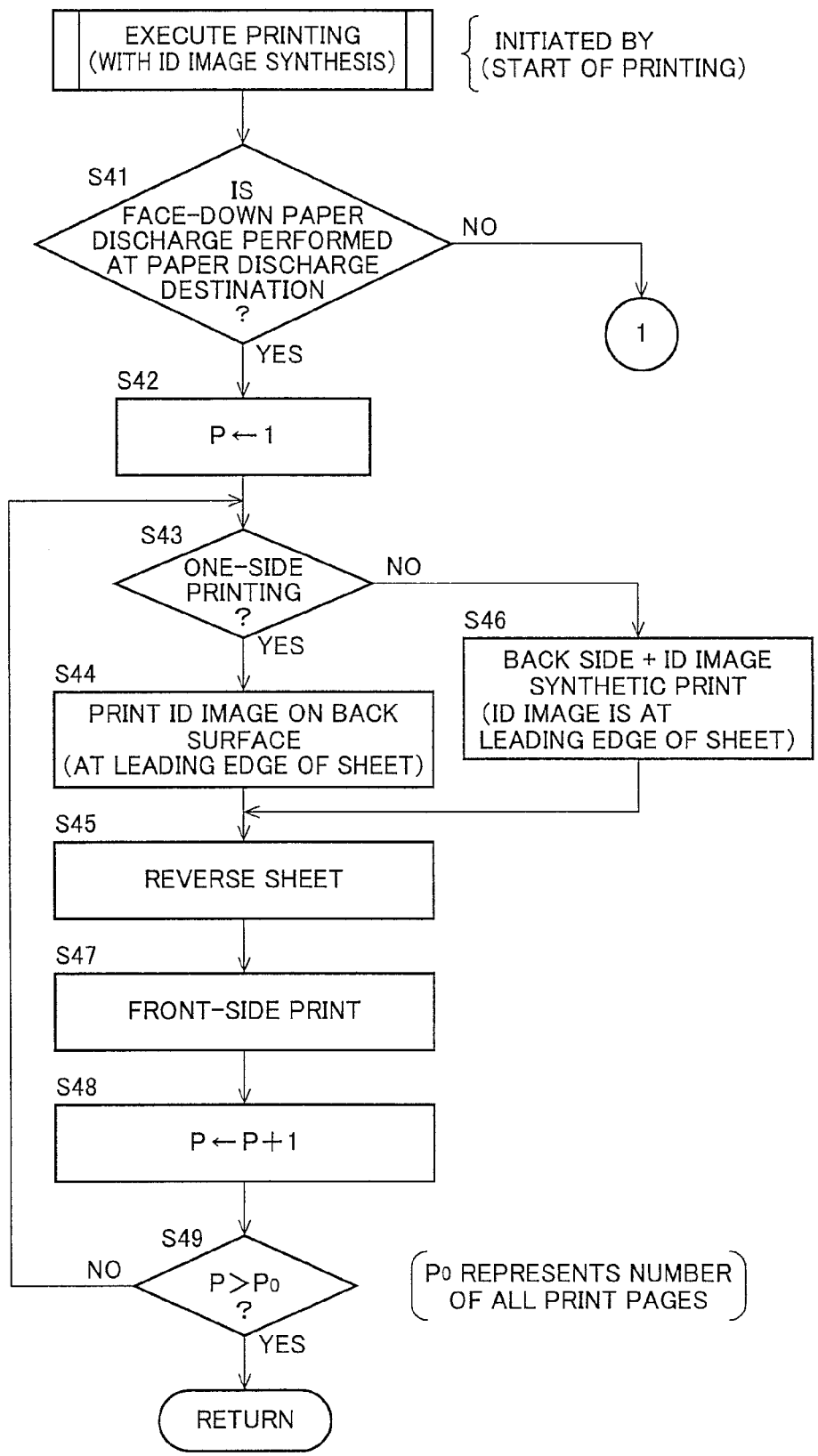
FIG. 13 is an explanatory flow diagram of details of a print execution step shown in FIG. 12.
Figure 14:
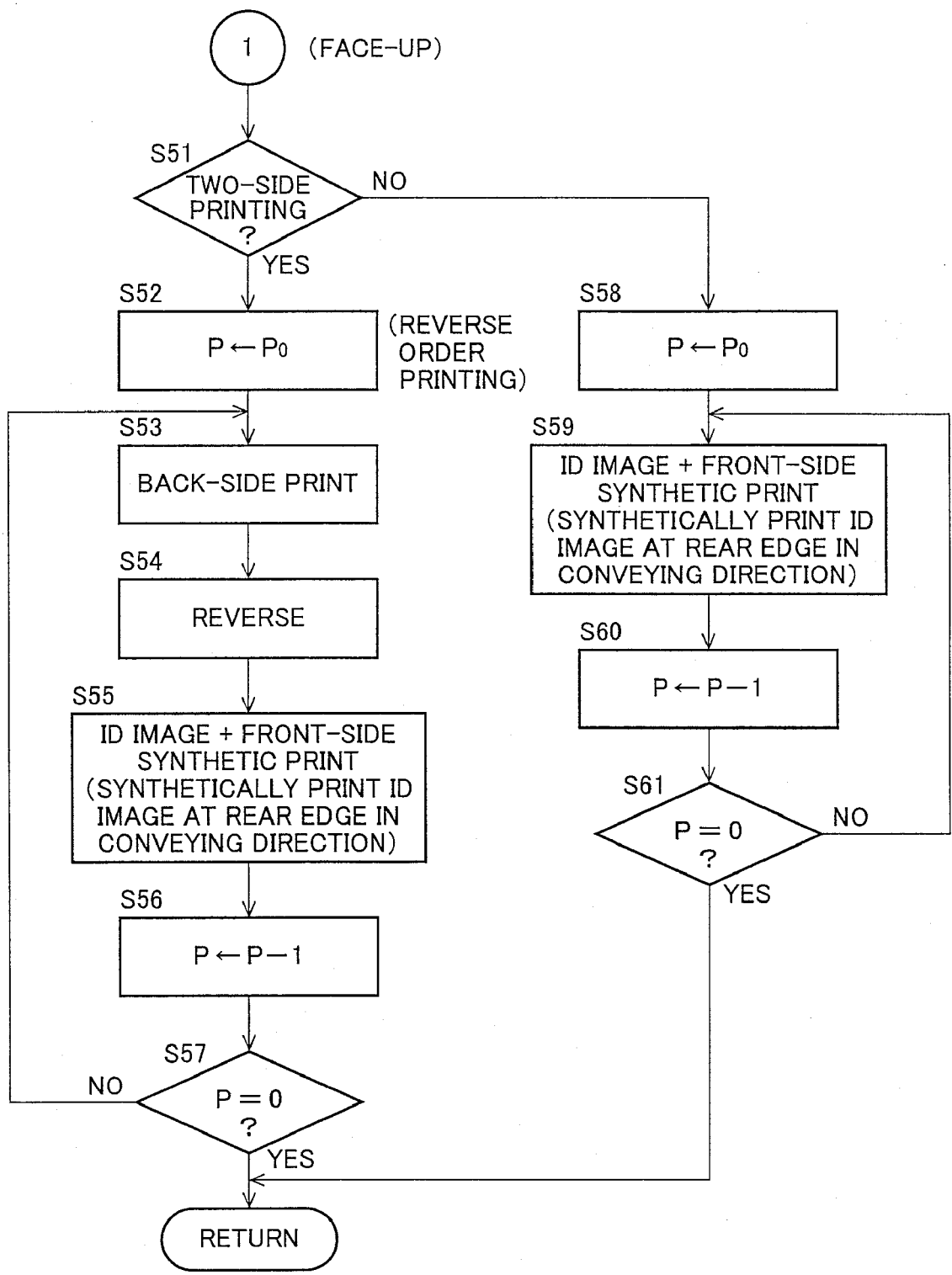
FIG. 14 is an explanatory flow diagram of a continuation from the flow shown in FIG. 13.

FIGS. 12 to 14 are explanatory flow diagrams of an example of the ID image printing method of the present invention. FIG. 13 is an explanatory flow diagram of details of a print execution step shown in FIG. 12 and FIG. 14 is an explanatory flow diagram of a continuation from the flow shown in FIG. 13.

In FIG. 12, a user operates a PC to execute a print mode specifying operation (step S31). Specifically, the output condition setting screen of the printer driver 111 is displayed to set whether the ID image can be synthesized, the paper discharge tray, the print condition, the paper discharge condition, etc. This setting information is transmitted from the PC to the image forming apparatus 1.

The image forming apparatus 1 then determines whether the ID image synthesis is specified (step S32), and if the ID image synthesis is specified (YES), it is determined whether the ID image reading portion is included in the specified paper discharge destination (step S33). Since presence information indicating the presence of the ID image reading portion corresponding to each paper discharge destination is registered in the storage portion 103 at the time of fabrication or by a service person, whether the ID image reading portion is included in the specified paper discharge destination can be determined by referring to the presence information.

If the ID image synthesis is not specified at step S32 (NO), a normal print process without the ID image synthesis is executed (step S34).

Even when the image forming apparatus 1 includes a plurality of paper discharge trays, the ID image reading portion may not be disposed on some paper discharge trays. In this case, if a user accidentally specifies a paper discharge tray not including the ID image reading portion, the ID image cannot be read even if the ID image synthesis is set. Therefore, if the specification of the ID image synthesis is accepted from the user, a paper discharge tray including the ID image reading portion may automatically be set as the paper discharge destination.

If the ID image reading portion is not included in the paper discharge destination at step S33 (NO), a screen for selecting whether the paper discharge destination is changed is displayed to determine whether the paper discharge destination is changed (step S35). If the user selects to change the paper discharge destination (YES), the paper discharge destination is changed to another paper discharge tray (step S36) and it is displayed on the screen that the destination is changed (step S37). A print process including the ID image synthesis is then executed (step S38). If the user selects not to change the paper discharge destination (NO), the flow goes to step S34 to execute a normal print process.

FIGS. 13 and 14 are explanatory flow diagrams of details of step S38 of FIG. 12. Description will be made of the case when the paper discharge destination is the paper discharge tray 63.

In FIG. 13, the image forming apparatus 1 initiates a process at the start of printing and determines whether the face-down paper discharge is performed at the paper discharge destination (step S41). In the case of the face-down paper discharge (YES), the number of printed pages is set to "1" (step S42) and it is determined whether the one-side printing is performed (step S43). If the face-up paper discharge is performed instead of the face-down paper discharge at step S41 (NO), the flow goes to step S51 of FIG. 14.

If it is determined that the one-side printing is performed at step S43 (YES), the image forming apparatus 1 prints the ID image data at the leading edge of the back surface of the recording paper (step S44) and reverses the recording paper (step S45). If it is determined that the two-side printing is performed instead of the one-side printing at step S43 (NO), the image data are printed on the back surface of the recording paper; the ID image data are printed at the leading edge of the same surface (step s46); and the flow goes to step S45.

The image forming apparatus 1 prints the image data on the front surface (step S47), adds "1" to the number of printed pages (step S48), and determines whether the number P of printed pages exceeds the number $P_0$ of all the print pages ($P > P_0$) (step S49). If $P > P_0$ is satisfied (YES), the flow is simply terminated and if $P > P_0$ is not satisfied (NO), the flow goes to step S43 to repeat the process.

In the case of the face-up paper discharge at step S41 of FIG. 13, the flow goes to step S51 of FIG. 14.

In FIG. 14, the image forming apparatus 1 determines whether the two-side printing is performed (step S51), and in the case of the two-side printing (YES), since the reverse order printing is performed, the number P of pages is set to "$P_0$", which is the number of all the print pages (step S52); the image data are printed on the back surface of the recording paper (step S53); and the paper sheet is reversed (step S54).

The image data are then printed on the front surface of the recording paper and the ID image data are printed at the rear edge of the same surface (step S55) to subtract "1" from the number P of the printed pages (step S56). It is determined whether the number P of the printed pages is "0" (step S57), and if the number P is "0" (YES), the flow is simply terminated. On the other hand, if the number P is not "0" at step S57 (NO), the flow goes to step S53 to repeat the process.

If the one-side printing is performed instead of the two-side printing at step S51 (NO), since the reverse order printing is performed, the number P of pages is set to "$P_0$", which is the number of all the print pages (step S58); the image data are printed on the front surface of the recording paper and the ID image data are printed at the rear edge of the same surface (step S59); and "1" is subtracted from the number P of the printed pages (step S60). It is determined whether the number P of the printed pages is "0" (step S61), and if the number P is "0" (YES), the flow is simply terminated. On the other hand, if the number P is not "0" at step S61 (NO), the flow goes to step S59 to repeat the process.

Figure 15:
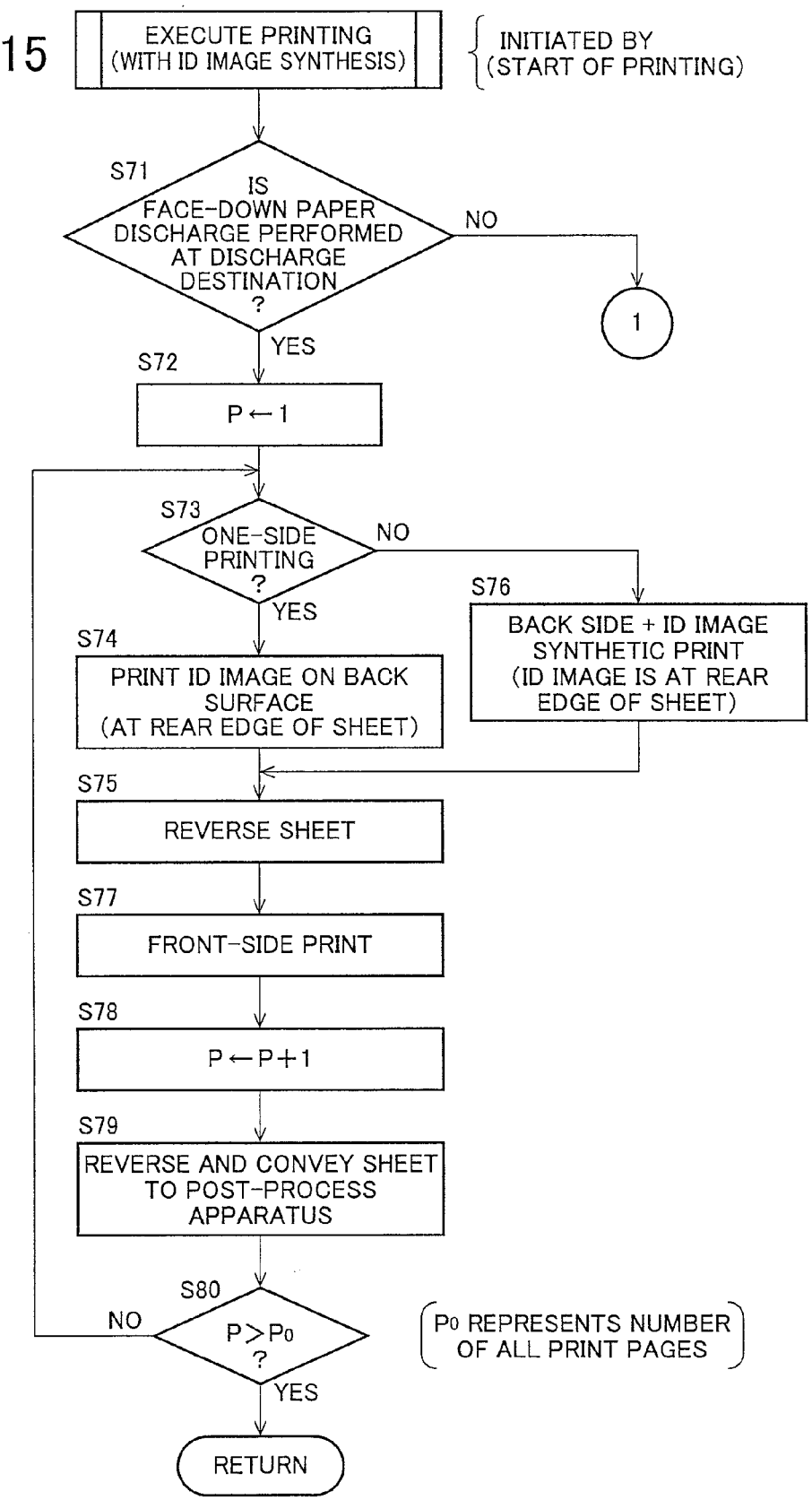
FIG. 15 is an explanatory flow diagram of another example in the print execution step shown in FIG. 12.
Figure 16:
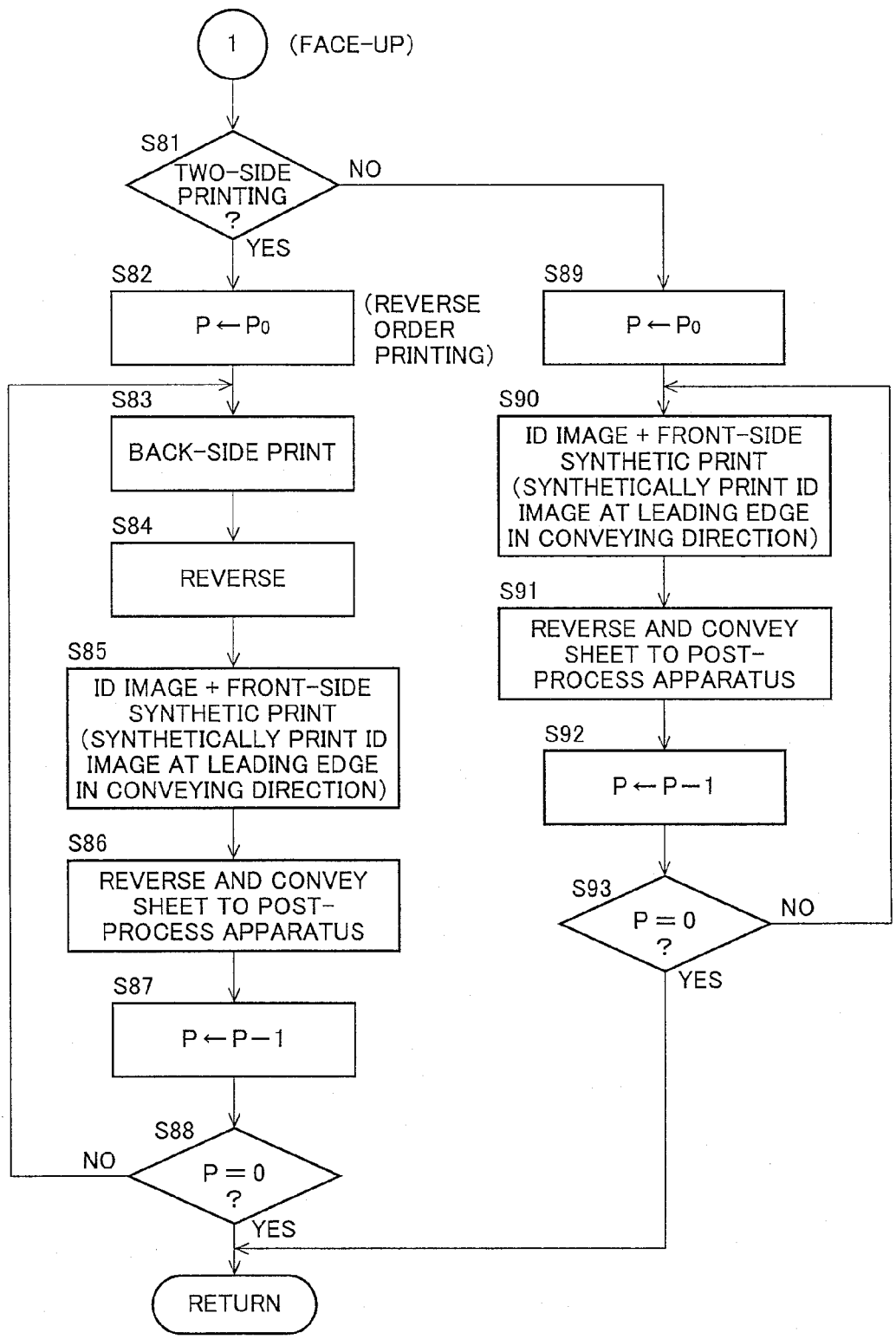
FIG. 16 is an explanatory flow diagram of a continuation from the flow shown in FIG. 15.

FIGS. 15 and 16 are explanatory flow diagrams of another example of step S38 shown in FIG. 12. Description will be made of the case when the paper discharge destination is the first paper discharge tray 43 or the second discharge tray 44.

In FIG. 15, the image forming apparatus 1 initiates a process at the start of printing and determines whether the face-down paper discharge is performed at the paper discharge destination (step S71). In the case of the face-down paper discharge (YES), the number of printed pages is set to "1" (step S72) and it is determined whether the one-side printing is performed (step S73). If the face-up paper discharge is performed instead of the face-down paper discharge at step S71 (NO), the flow goes to step S81 of FIG. 16.

If it is determined that the one-side printing is performed at step S73 (YES), the image forming apparatus 1 prints the ID image data at the rear edge of the back surface of the recording paper (step S74) and reverses the recording paper (step S75). If it is determined that the two-side printing is performed instead of the one-side printing at step S73 (NO), the image data are printed on the back surface of the recording paper; the ID image data are printed at the rear edge of the same surface (step S76); and the flow goes to step S75.

The image forming apparatus 1 prints the image data on the front surface (step S77), adds "1" to the number of printed pages (step S78). The recording paper is reversed and conveyed to the post-process apparatus (step S79), it is determined whether the number P of printed pages exceeds the number $P_0$ of all the print pages (P>$P_0$) (step S80). If P>$P_0$ is satisfied (YES), the flow is simply terminated and if P>$P_0$ is not satisfied (NO), the flow goes to step S73 to repeat the process.

In the case of the face-up paper discharge at step S71 of FIG. 15, the flow goes to step S81 of FIG. 15.

In FIG. 16, the image forming apparatus 1 determines whether the two-side printing is performed (step S81), and in the case of the two-side printing (YES), since the reverse order printing is performed, the number P of pages is set to "$P_0$", which is the number of all the print pages (step S82); the image data are printed on the back surface of the recording paper (step S83); and the paper sheet is reversed (step S84). The image data are then printed on the front surface of the recording paper and the ID image data are printed at the leading edge of the same surface in the conveying direction (step S85), and the recording paper is reversed and conveyed to the post-process apparatus (step S86). From the number P of the printed pages, "1" is subtracted (step S87). It is determined whether the number P of the printed pages is "0" (step S88), and if the number P is "0" (YES), the flow is simply terminated. On the other hand, if the number P is not "0" at step S88 (NO), the flow goes to step S83 to repeat the process.

If the one-side printing is performed instead of the two-side printing at step S81 (NO), since the reverse order printing is performed, the number P of pages is set to "$P_0$", which is the number of all the print pages (step S89); the image data are printed on the front surface of the recording paper and the ID image data are printed at the leading edge of the same surface in the conveying direction (step S90); and the recording paper is reversed and conveyed to the post-process apparatus (step S91). From the number P of the printed pages, "1" is subtracted (step S92). It is determined whether the number P of the printed pages is "0" (step S93), and if the number P is "0" (YES), the flow is simply terminated. On the other hand, if the number P is not "0" at step S93 (NO), the flow goes to step S90 to repeat the process.

Figure 17:
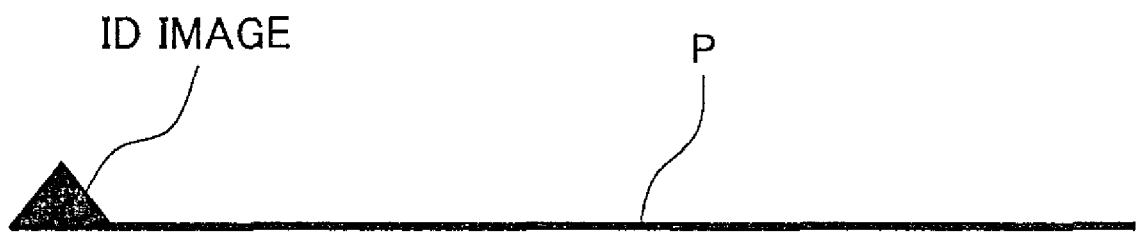
FIG. 17 depicts a cross-section of a recording paper.
Figure 18:
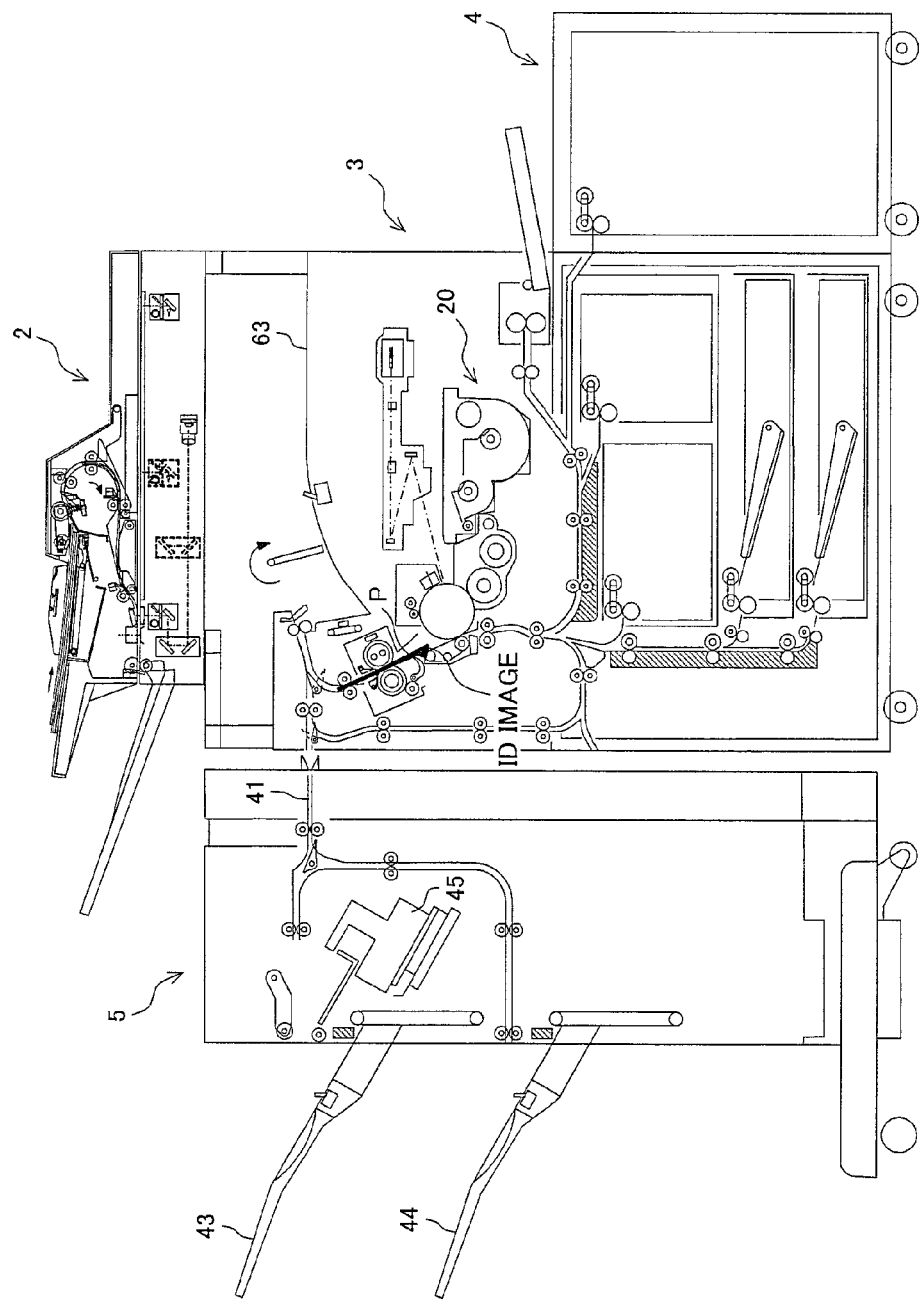
FIG. 18 depicts an example of a transport state of the recording paper shown in FIG. 17 and a positional relationship of the ID image.
Figure 19:
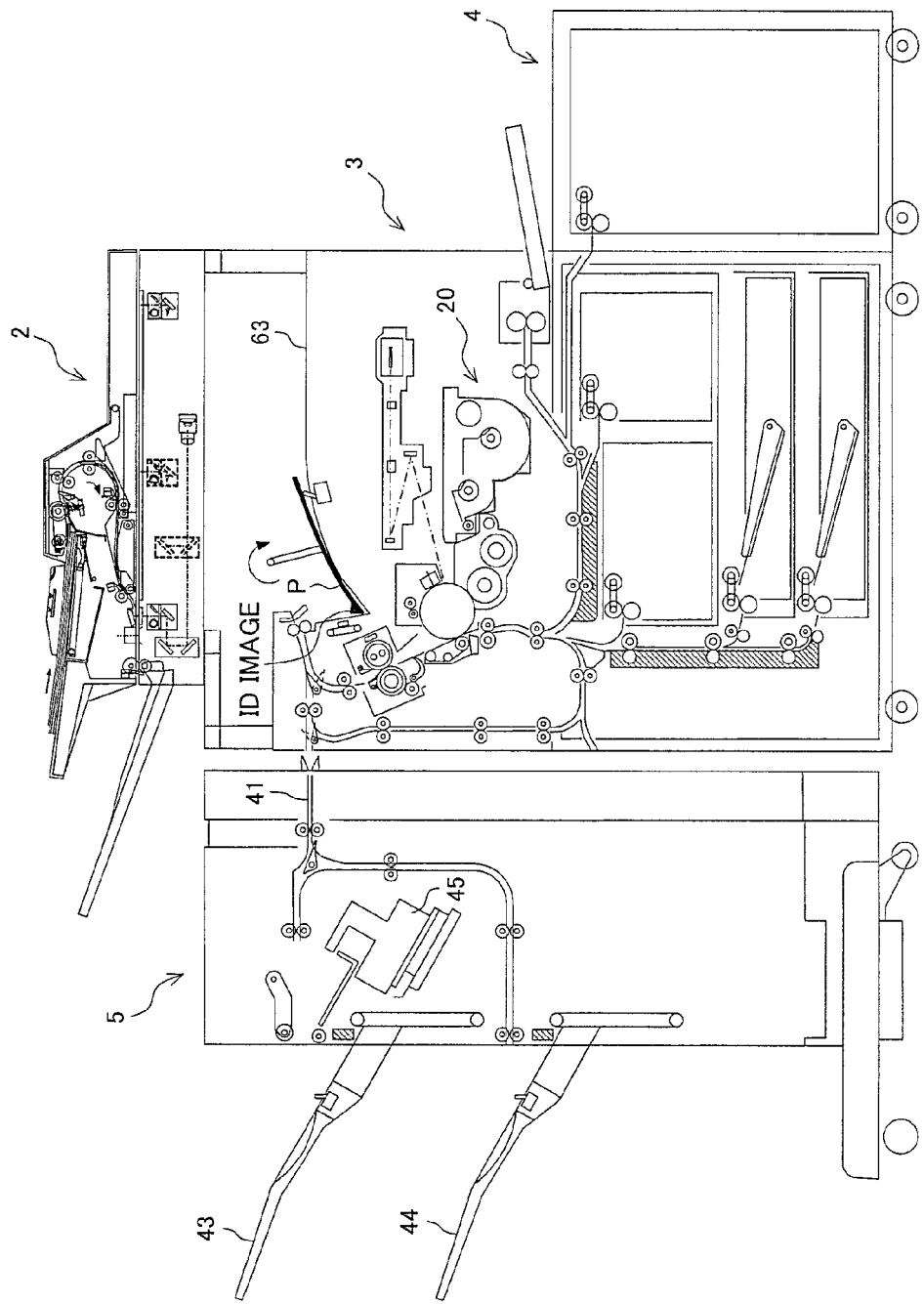
FIG. 19 depicts an example of a transport state of the recording paper shown in FIG. 17 and a positional relationship of the ID image.
Figure 20:
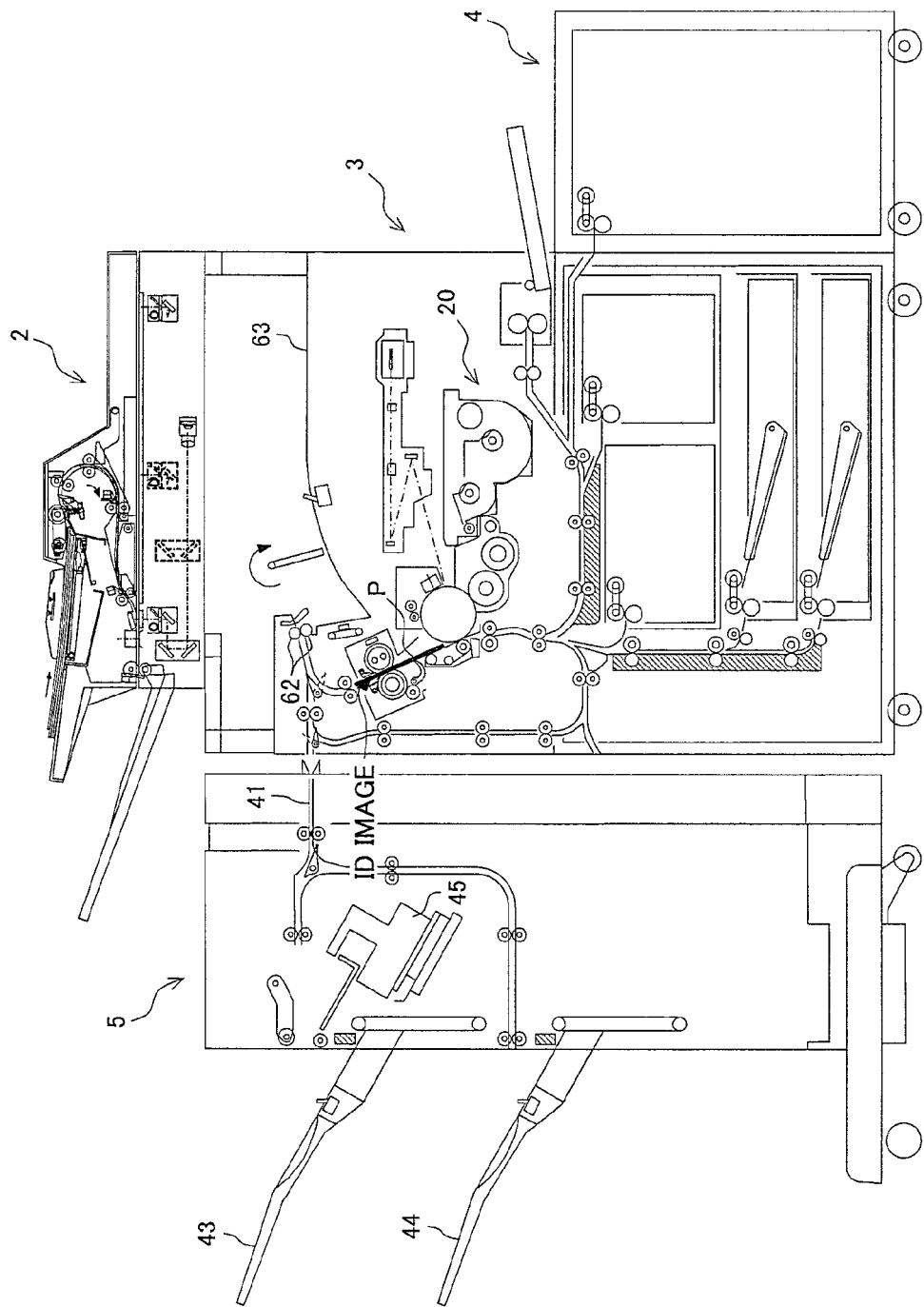
FIG. 20 depicts another example of a transport state of the recording paper shown in FIG. 17 and a positional relationship of the ID image.
Figure 21:
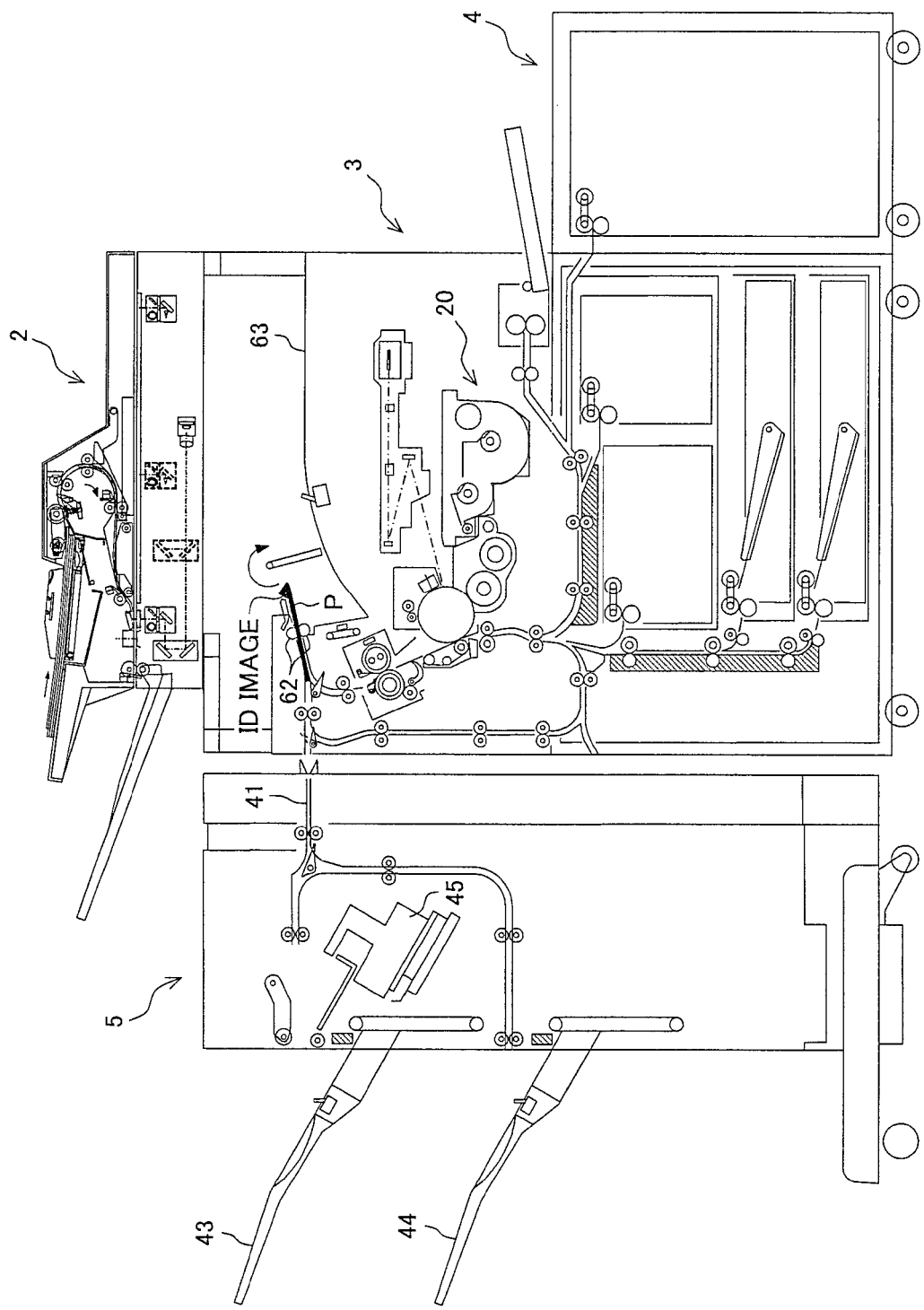
FIG. 21 depicts another example of a transport state of the recording paper shown in FIG. 17 and a positional relationship of the ID image.
Figure 22:
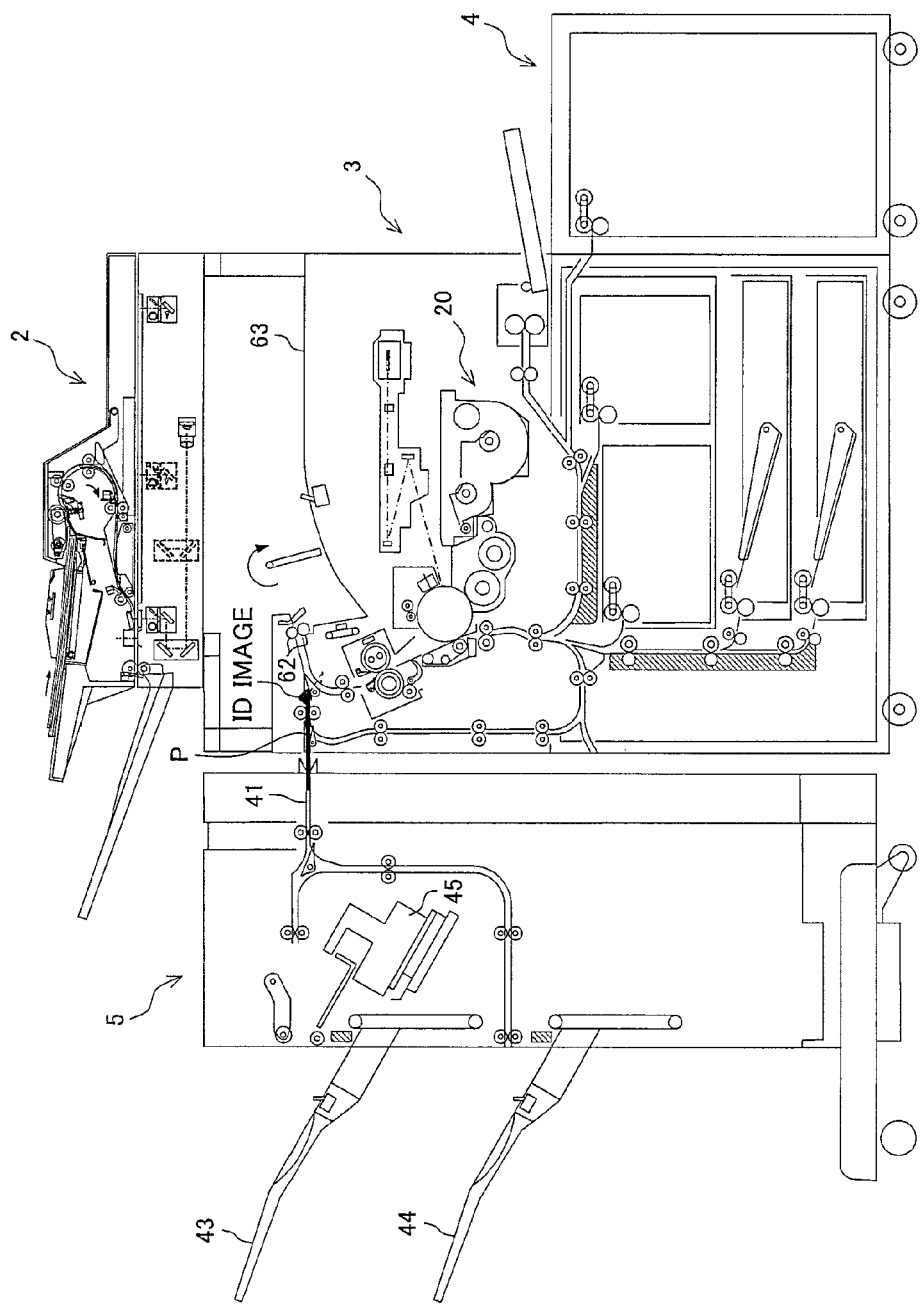
FIG. 22 depicts another example of a transport state of the recording paper shown in FIG. 17 and a positional relationship of the ID image.
Figure 23:
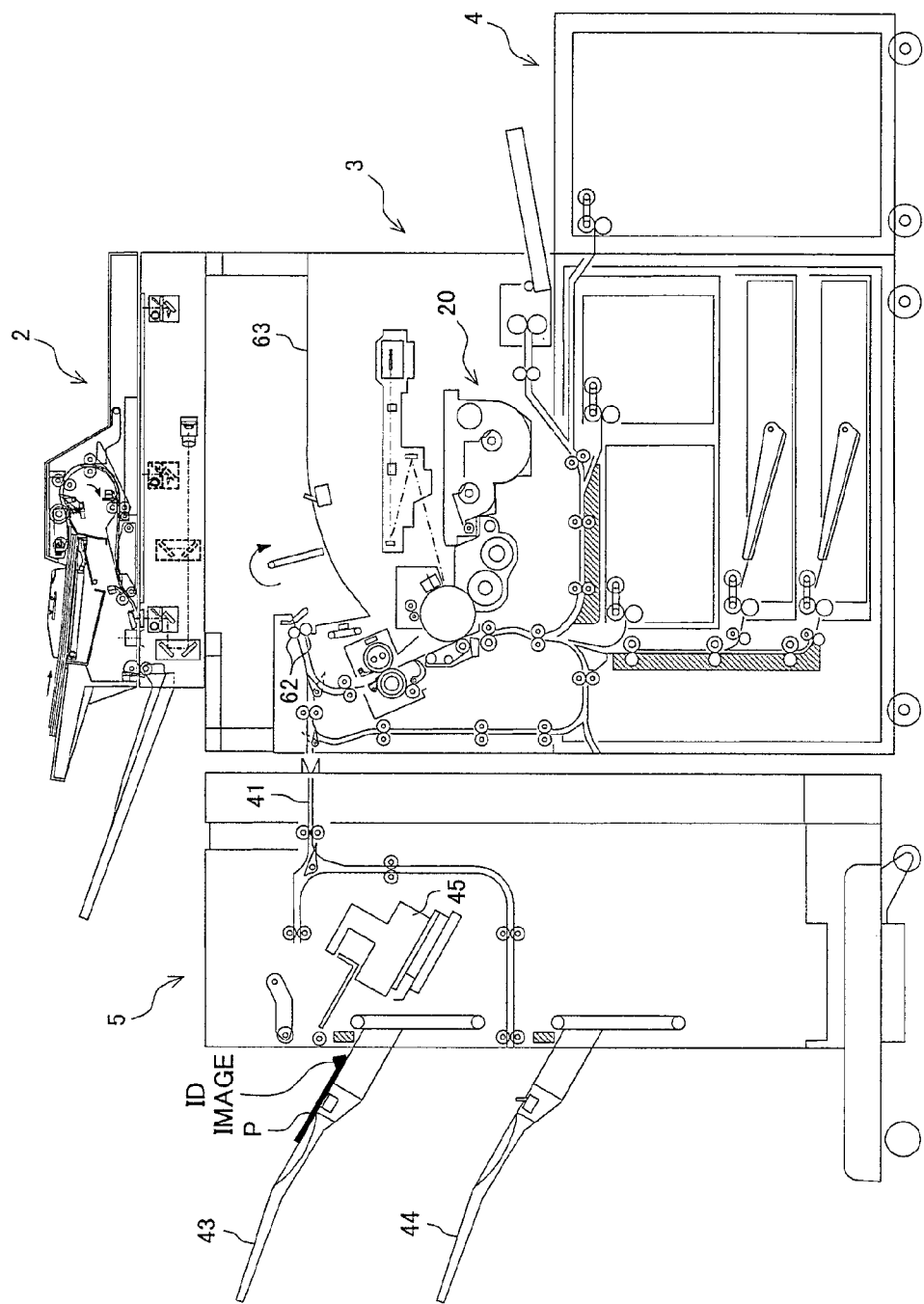
FIG. 23 depicts another example of a transport state of the recording paper shown in FIG. 17 and a positional relationship of the ID image.

FIG. 17 depicts a cross-section of the recording paper P, and the ID image is printed at the edge of the recording paper P. FIGS. 18 to 23 depict examples of a transport state of the recording paper P shown in FIG. 17 and a positional relationship of the ID image. FIGS. 18 and 19 show an example when the paper discharge destination is the paper discharge tray 63 and FIGS. 20 to 23 show an example when the paper discharge destination is the first discharge tray 43 or the second discharge tray 44.

In FIGS. 18 and 19, if the paper discharge tray 63 is set as the paper discharge destination, the recording paper P is transported to the paper discharge tray 63 as shown in FIG. 18 to FIG. 19 and therefore, the conveying direction of the recording paper P is maintained and not reversed. Therefore, the ID image data are printed at the rear edge of the recording paper P in the conveying direction and the paper sheet is discharged into the paper discharge tray 63 with the ID image printed surface facing upward.

In FIGS. 20 to 23, if the first discharge tray 43 or the second discharge tray 44 is set as the paper discharge destination, since the recording paper P is transported to the first discharge tray 43 or the second discharge tray 44 as shown in FIG. 20 to FIG. 23, the recording paper P is not discharged in the paper discharge tray 63 and the conveying direction of the recording paper P is reversed by the reverse roller 62. That is, since the conveying direction is reversed, the rear edge of the recording paper becomes the leading edge and the leading edge becomes the rear edge, i.e., the leading and rear edges are exchanged.

Therefore, the ID image data are printed at the leading edge of the recording paper in the conveying direction. The conveying direction of the recording paper P is reversed by the reverse roller 62 such that the ID image is located at the rear edge of the recording paper in the conveying direction. As a result, the recording paper edges having the ID images printed thereon are always the rear edges when the paper sheets are discharged in the first discharge tray 43 or the second discharge tray 44.

As described above, since the present invention can realize with a simple apparatus configuration a function of synthetically printing an ID image specific to a user on a recording paper and reading the ID image to notify the user of a recording paper (print) forgotten to be taken out without including a special recording paper conveying portion and can change a print surface and location of the ID image depending on output conditions of recording papers (such as paper discharge destinations, print conditions, and paper discharge conditions), the paper sheets are discharged with the ID image print surface always facing upward under any output conditions and the reading portion can certainly read the ID images.

Since the present invention can realize with a simple apparatus configuration a function of synthetically printing an ID image specific to a user on a recording paper and reading the ID image to notify the user of a recording paper (print) forgotten to be taken out without including a special recording paper conveying portion and can change a print surface and location of the ID image depending on output conditions of recording papers (such as paper discharge destinations, print conditions, and paper discharge conditions), the paper sheets are discharged with the ID image print surface always facing upward under any output conditions and the reading portion can certainly read the ID images.

The invention claimed is:

1. An image forming apparatus comprising an image forming portion that synthetically prints image data and ID image data specific to a user on a recording paper, a plurality of paper discharging portions that discharges and accumulates the recording papers having the image data and the ID image data synthetically printed by the image forming portion, and an reading portion that reads the ID images of the recording papers accumulated in the paper discharging portions, the image forming apparatus notifying an external device specified by a user corresponding to the ID image read by the reading portion that the recording papers in the paper discharging portion must be removed, the apparatus comprising:
an output condition setting portion that sets output conditions of the recording papers,
the image forming portion printing the image data on a recording paper and the ID image data on an edge of the recording paper in accordance with the output conditions set by the output condition setting portion,
the reading portion reading the ID images at the edges of the recording papers while the recording papers are accumulated in the paper discharging portion.

2. The image forming apparatus of claim 1, wherein
the output condition setting portion sets a paper discharging portion that is a paper discharge destination of a recording paper from the plurality of paper discharging portions, and wherein
the image forming portion changes the edge where the ID image data of the recording papers are printed in accordance with the paper discharging portion set as the paper discharge destination by the output condition setting portion and discharges the recording papers into the paper discharging portion such that the recording paper edges having the ID images printed thereon are always rear edges.

3. The image forming apparatus of claim 1, wherein
the output condition setting portion sets a print condition of the recording papers, and wherein
the image forming portion changes the edge where the ID image data of the recording paper are printed in accordance with the print condition set by the output condition setting portion and discharges the recording papers into the paper discharging portion such that the recording paper edges having the ID images printed thereon are always rear edges.

4. The image forming apparatus of claim 3, wherein the output condition setting portion sets the print condition of the recording papers to two-side printing that performs printing on both sides of a recording paper or one-side printing that performs printing on one side of a recording paper.

5. The image forming apparatus of claim 1, wherein
the output condition setting portion sets a paper discharge condition of the recording papers, and wherein
the image forming portion changes the surface where the ID image data of the recording paper are printed in accordance with the paper discharge condition set by the output condition setting portion and discharges the recording papers into the paper discharging portion such that the ID image print surface always faces upward.

6. The image forming apparatus of claim 5, wherein the output condition setting portion sets the paper discharge condition of the recording papers to face-down paper discharge that discharges the recording papers into the paper discharging portion with an image print surface facing down or face-up paper discharge that discharges the recording papers into the paper discharging portion with the image print surface facing up.

7. The image forming apparatus of claim 6, wherein the image forming portion prints the ID image data on one surface of a recording paper, prints the image data on the other surface of the recording paper, and discharges the recording paper into the paper discharging portion with the image print surface facing downward in the case of the face-down paper discharge.

8. The image forming apparatus of claim 7, comprising a reversing portion that reverses a conveying direction of a recording paper, wherein
the image forming portion prints the ID image data at a leading edge of one surface of a recording paper in the recording paper conveying direction, prints the image data on the other surface of the recording paper after the conveying direction of the recording paper is reversed by the reversing portion, and discharges the recording paper into the paper discharging portion with the image print surface facing downward.

9. The image forming apparatus of claim 6, wherein the image forming portion synthetically prints the image data and the ID image data on the same surface of a recording paper and discharges the recording paper into the paper discharging portion with the synthetically printed surface facing upward in the case of the face-up paper discharge and the one-side printing.

10. The image forming apparatus of claim 9, wherein the image forming portion prints the image data on one surface of the recording paper and prints the ID image data at the rear edge of the same surface in the recording paper conveying direction.

11. The image forming apparatus of claim 6, comprising a reversing portion that reverses a conveying direction of a recording paper, wherein
the image forming portion prints the image data on one surface of a recording paper, synthetically prints the image data on the other surface of the recording paper and the ID image data at the rear edge of the surface in the recording paper conveying direction after the conveying direction of the recording paper is reversed by the reversing portion, and discharges the recording paper into the paper discharging portion with the synthetically printed surface facing upward in the case of the face-up paper discharge and the two-side printing.

12. The image forming apparatus of claim 1, wherein the paper discharging portion accumulates the recording papers having the image data and the ID image data synthetically printed by the image forming portion with the ID image print surface facing upward.

13. The image forming apparatus of claim 1, wherein when accepting ID image synthesis specification from a user, the output condition setting portion sets the paper discharging portion disposed with the reading portion as a paper discharge destination.

* * * * *